(12) United States Patent
Hatano et al.

(10) Patent No.: US 12,391,005 B2
(45) Date of Patent: Aug. 19, 2025

(54) FRICTION STIR SPOT WELDING METHOD AND WELDED ASSEMBLY UTILIZING SAME

(71) Applicant: KAWASAKI JUKOGYO KABUSHIKI KAISHA, Kobe (JP)

(72) Inventors: Ryoichi Hatano, Kobe (JP); Kenichi Kamimuki, Kobe (JP); Shintaro Fukada, Kobe (JP); Shunsuke Haruna, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 115 days.

(21) Appl. No.: 18/112,521

(22) Filed: Feb. 22, 2023

(65) Prior Publication Data

US 2023/0191710 A1 Jun. 22, 2023

Related U.S. Application Data

(63) Continuation of application No. PCT/JP2021/031098, filed on Aug. 25, 2021.

(30) Foreign Application Priority Data

Aug. 25, 2020 (JP) ................. 2020-141804

(51) Int. Cl.
*B29C 65/06* (2006.01)
*B29K 101/12* (2006.01)
*B29K 105/08* (2006.01)

(52) U.S. Cl.
CPC ...... *B29C 65/0681* (2013.01); *B29K 2101/12* (2013.01); *B29K 2105/08* (2013.01)

(58) Field of Classification Search
CPC .................................. B29C 65/0681
See application file for complete search history.

(56) References Cited

U.S. PATENT DOCUMENTS 6,722,556 B2* 4/2004 Schilling ............ B23K 20/1265
228/2.1
7,507,310 B2* 3/2009 Manicke ............... B29C 66/721
228/112.1

(Continued)

FOREIGN PATENT DOCUMENTS

JP 2015-186869 A 10/2015
JP 6020501 B2 11/2016

(Continued)

*Primary Examiner* — Timothy Kennedy
(74) *Attorney, Agent, or Firm* — XSENSUS LLP

(57) ABSTRACT

A first member formed of a thermoplastic resin molding mixed with a fiber material and a second member formed of a molding containing at least a thermoplastic resin are welded by friction stir spot welding using a double-acting tool for friction stir spot welding. An overlapping part between the first member and the second member is formed, and the tool is disposed against the overlapping part while the pin and the shoulder are rotated about the rotation axis. The pin is plunged into the overlapping part, and friction stir is performed to cause extension fibers to remain around a plunging region of the pin while the shoulder is retracted to release an overflow material. The shoulder is brought closer to the overlapping part to wrap the extension fibers into the overflow material when the overflow material is backfilled while the pin is retracted from the overlapping part.

14 Claims, 18 Drawing Sheets

(56) References Cited

U.S. PATENT DOCUMENTS

| | | | | |
|---|---|---|---|---|
| 7,654,435 | B2 * | 2/2010 | Kumagai | B23K 20/1265 228/2.1 |
| 7,879,421 | B2 * | 2/2011 | Manicke | B29C 66/3034 428/297.4 |
| 8,518,198 | B2 * | 8/2013 | de Traglia Amancio Filho | B29C 66/1122 156/308.2 |
| 8,567,032 | B2 * | 10/2013 | de Traglia Amancio Filho | B23K 20/129 29/283.5 |
| 8,950,650 | B2 * | 2/2015 | Okada | B23K 20/122 228/2.1 |
| 9,302,343 | B2 * | 4/2016 | Kumagai | B23K 20/126 |
| 9,333,703 | B2 * | 5/2016 | Goehlich | B29C 66/0242 |
| 9,561,617 | B2 * | 2/2017 | Goehlich | B29C 66/721 |
| 9,987,796 | B2 * | 6/2018 | Wang | B29C 65/18 |
| 10,173,370 | B2 * | 1/2019 | Ueno | B29C 65/606 |
| 10,259,170 | B2 * | 4/2019 | Wang | B29C 65/18 |
| 11,633,802 | B2 * | 4/2023 | Okada | B23K 20/1245 228/112.1 |
| 2008/0006677 | A1 * | 1/2008 | Kumagai | B23K 20/125 228/101 |
| 2008/0156411 | A1 * | 7/2008 | Manicke | B29C 65/0681 501/11 |
| 2009/0098369 | A1 * | 4/2009 | Manicke | B29C 66/43 428/332 |
| 2011/0131784 | A1 * | 6/2011 | de Traglia Amancio Filho | B29C 66/21 29/428 |
| 2011/0206899 | A1 * | 8/2011 | Seiders | B29C 66/21 156/221 |
| 2012/0328837 | A1 * | 12/2012 | Goehlich | B29C 66/836 156/304.6 |
| 2013/0098534 | A1 * | 4/2013 | de Traglia Amancio Filho | B29C 66/1122 156/73.5 |
| 2014/0069985 | A1 * | 3/2014 | Okada | B23K 20/1245 228/2.1 |
| 2015/0068662 | A1 * | 3/2015 | Wang | B29C 66/41 156/535 |
| 2015/0183053 | A1 * | 7/2015 | Kumagai | B23K 20/1265 228/112.1 |
| 2016/0176103 | A1 * | 6/2016 | Rousseau | B29C 66/7392 403/270 |
| 2016/0221249 | A1 * | 8/2016 | Goehlich | B29C 66/72143 |
| 2017/0129161 | A1 | 5/2017 | Ueno et al. | |
| 2017/0136686 | A1 * | 5/2017 | Ueno | B23K 20/22 |
| 2017/0304935 | A1 * | 10/2017 | Okada | B23K 20/22 |
| 2018/0272619 | A1 * | 9/2018 | Wang | B29C 66/21 |
| 2021/0331421 | A1 | 10/2021 | Okada et al. | |

FOREIGN PATENT DOCUMENTS

| | | | | |
|---|---|---|---|---|
| WO | WO-2015145253 | A1 * | 10/2015 | ........... B21D 39/032 |
| WO | WO-2015145258 | A1 * | 10/2015 | ......... B29C 65/0681 |
| WO | 2020/145243 | A1 | 7/2020 | |

* cited by examiner

<ENLARGED VIEW OF PART E1>

PIN PLUNGING REGION (STIRRED WELD)

<ENLARGED VIEW OF PART E2>

FRICTION STIR SPOT WELDING METHOD AND WELDED ASSEMBLY UTILIZING SAME

CROSS-REFERENCE TO RELATED APPLICATIONS

This application is a bypass continuation of PCT Application No. PCT/JP2021/031098, filed Aug. 25, 2021, which claims priority to Japanese Patent Application No. 2020-141804, filed on Aug. 25, 2020, the entire disclosure of each are incorporated herein by reference.

FIELD

The present disclosure relates to a friction stir spot welding method for welding a first member and a second member that are each formed of a thermoplastic resin molding mixed with a fiber material using a double-acting tool for friction stir spot welding, and a welded assembly acquired by using the method

BACKGROUND

Thermoplastic resin moldings mixed with fiber reinforcements are sometimes used as constituent members of a structure such as an aircraft, a railway vehicle, or an automobile. Examples of the resin moldings include a molding obtained by mixing short fibers or long fibers as the fiber reinforcements with a thermoplastic resin, a fiber array body in which continuous fibers are arrayed in a predetermined direction, and a molding obtained by impregnating a woven fabric of continuous fibers with a thermoplastic resin.

Manufacturing the structure may require two members to be welded. As one of methods of the welding, friction stir spot welding is known. Japanese Patent No. 6020501 discloses a welding method in which two resin moldings each mixed with a fiber reinforced material are welded by friction stir spot welding using a double-acting rotary tool including a pin member and a shoulder member coaxially disposed. This technique causes the shoulder member to be preliminarily plunged into an overlapping part of the two resin moldings to be spot welded to perform friction stir, and the pin member to be retracted upward to release a resin material overflowed by the plunging of the shoulder member. Thereafter, the pin member is lowered to fill back the overflowed resin material, thereby forming a stirred weld for spot-welding the two resin moldings in the overlapping part.

In general, a shoulder-preceding method in which the shoulder member is preliminarily plunged can form a stirred weld with a large diameter, the method being advantageous for improving welding strength. However, research of the present inventors reveals that when the welding method of Patent Literature 1 is used for welding a fiber-reinforced resin molding, sufficient welding strength may not be obtained. The research also reveals that insufficient fusion strength between the stirred weld and the resin molding around the stirred weld causes the insufficient welding strength.

SUMMARY

A friction stir spot welding method according to an aspect of the present disclosure is configured to weld a first member formed of a thermoplastic resin molding mixed with a fiber material and a second member formed of a molding containing at least a thermoplastic resin by using a double-acting tool for friction stir spot welding including a pin and a shoulder including a hollow part into which the pin is inserted, the friction stir spot welding method including: disposing the first member and the second member to form an overlapping part where the first member and the second member overlap each other while being at least partially in contact with each other; disposing the tool against the overlapping part to cause a rotation axis of the tool to be along an overlapping direction of the first member and the second member while rotating at least the pin around the rotation axis; plunging the pin into the overlapping part from a first member side to perform friction stir to cause extension fibers extended from a fiber material in the overlapping part to remain around a plunging region of the pin while retracting the shoulder from the overlapping part in a direction of the rotation axis to release a resin molding material overflowed by the plunging of the pin into a surrounding region of the pin caused by the retraction of the shoulder; and bringing the shoulder close to the overlapping part in the direction of the rotation axis to wrap the extension fibers when the resin molding material overflowed is backfilled into the plunging region from the surrounding region while retracting the pin from the overlapping part.

The friction stir spot welding method is configured to preliminarily plunge the pin into the overlapping part of the first member and the second member by using the double-acting tool for friction stir spot welding to perform friction stir. The plunging region of the pin finally becomes a stirred weld, and at least the fiber material mixed with the first member is also stirred in the overlapping part. However, the fiber material is not neatly cut at a boundary between the plunging region and a periphery thereof, and partially extends from the boundary (remaining of the extension fibers). Thereafter, backfill operation using the shoulder is performed while wrapping the extension fibers with the resin molding material overflowed by the plunging of the pin. Thus, the stirred weld is brought into a state where the extension fibers extending from the periphery of the plunging region enter the inside of the stirred weld. That is, the stirred weld, and the first and second members around the stirred and welded portion, are not only welded depending on welding between the resins, but also connected and welded by the extension fibers.

A welded assembly according to another aspect of the present disclosure includes: a first member formed of a thermoplastic resin molding mixed with a fiber material; a second member formed of a molding containing at least a thermoplastic resin; an overlapping part in which the first member and the second member overlap each other while at least partially being in contact with each other; and a stirred weld in which the first member and the second member are welded by friction stir spot welding, the stirred weld being provided in the overlapping part, the stirred weld including a wrapped part in which extension fibers extending from the fiber material in the overlapping part extend from a periphery of the stirred weld and are wrapped into a resin material constituting the stirred weld.

The welded assembly is provided with the stirred weld including the wrapped part in which the extension fibers extending from the periphery of the stirred weld are wrapped into the resin material.

This structure causes the stirred weld, and the first and second members around the stirred and welded portion to be not only welded depending on welding between the resins, but also connected by the extension fibers.

DETAILED DESCRIPTION

Hereinafter, embodiments of the present disclosure will be described in detail with reference to the drawings. A friction stir spot welding method according to the present disclosure can be applied to manufacturing of various welded assemblies obtained by stacking two or more structures each formed of a thermoplastic resin molding mixed with a fiber material and welded by spot welding, such as plates, frames, exterior members, or columnar members. The welded assembly manufactured serves as a component of a structure such as an aircraft, a railway vehicle, or an automobile, for example.

[Configuration of Double-Acting Friction Stir Spot Welding Device]

Figure 1:
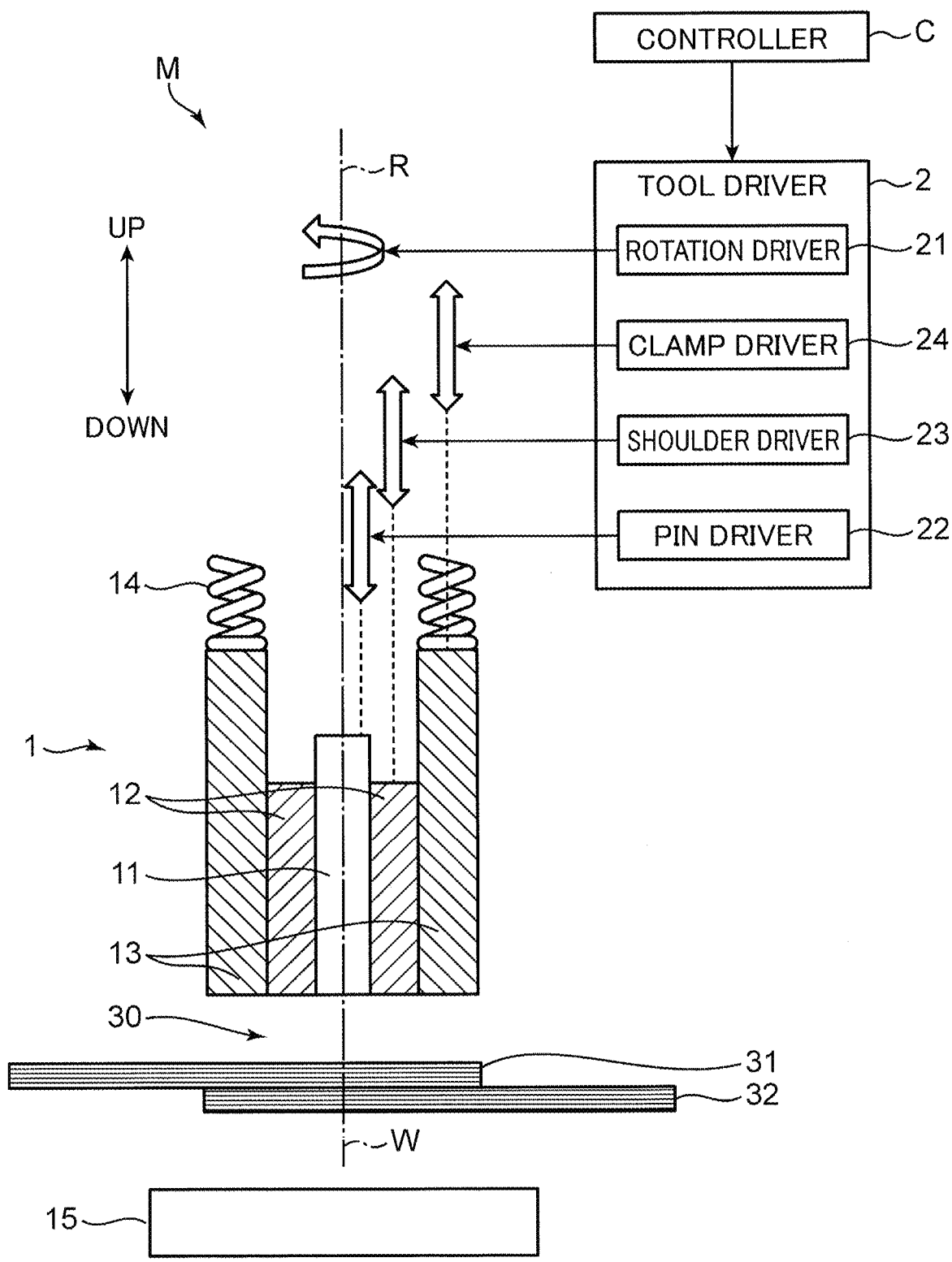
FIG. 1 is a schematic diagram illustrating a configuration of a double-acting friction stir spot welding device capable of performing a welding method according to the present disclosure.

With reference to FIG. 1, there will be described first a configuration example of a double-acting friction stir spot welding device M capable of performing the friction stir spot welding method according to the present disclosure. The friction stir spot welding device M includes a double-acting tool 1 for friction stir spot welding, a tool driver 2 that rotates, and lifts and lowers the tool 1, and a controller C that controls operation of the tool driver 2. Although FIG. 1 indicates directions "up" and "down", the directions are for convenience of description and are not intended to limit an actual direction of the tool 1 in use.

The tool 1 is supported by a tool fixing part. The tool fixing part can be a distal end part of an articulated robot, for example. A backup 15 is disposed facing a lower end surface of the tool 1. Between the tool 1 and the backup 15, at least two fiber-reinforced thermoplastic resin moldings to be welded are disposed. FIG. 1 illustrates an example in which an overlapping part 30 disposed between the tool 1 and the backup 15, the overlapping part 30 including a first member 31 made of a flat plate and a second member 32 also made of a flat plate, partially overlapping each other in a vertical direction.

The tool 1 includes a pin 11, a shoulder 12, a clamp 13 and a spring 14. The pin 11 is formed in a columnar shape, and is disposed with its axis extending in the vertical direction. The pin 11 is rotatable about the axis as a rotation axis R, and is movable up and down along the rotation axis R, or can advance and retract. When the tool 1 is used, the rotation axis R and a spot welding position W in the overlapping part 30 are aligned.

The shoulder 12 includes a hollow part into which the pin 11 is inserted, and is a member formed in a cylindrical shape. The shoulder 12 has an axis that is coaxial with the axis of the pin 11, serving as the rotation axis R. The shoulder 12 rotates about the rotation axis R and moves up and down, or advances and retracts in the vertical direction along the rotation axis R. Both the shoulder 12 and the pin 11 inserted into the hollow part relatively move in a direction of the rotation axis R while rotating about the rotation axis R. That is, the pin 11 and the shoulder 12 not only simultaneously move up and down along the rotation axis R, but also independently move such that one moves down and the other moves up.

The clamp 13 includes a hollow part into which the shoulder 12 is inserted, and is a member formed in a cylindrical shape. The clamp 13 has an axis that is also coaxial with the rotation axis R. The clamp 13 does not rotate about the axis, but moves up and down in the vertical direction along the rotation axis R, or advances and retracts. The clamp 13 serves to surround an outer periphery of the pin 11 or the shoulder 12 when the pin 11 or the shoulder 12 performs friction stir. The clamp 13 surrounding the outer periphery enables a friction stir spot welding part to be finished smoothly without scattering friction stirred materials.

The spring 14 is attached to the clamp 13 on its upper end side to press the clamp 13 downward in a direction toward the overlapping part 30. The clamp 13 is attached to the tool fixing part with the spring 14 interposed therebetween. The backup 15 includes a plane that comes into contact with a welding target (overlapping part 30) on its lower surface side. The backup 15 is a backing member that supports the overlapping part 30 when the pin 11 or the shoulder 12 is plunge into the overlapping part 30. The clamp 13 pressed by the spring 14 presses the overlapping part 30 against the backup 15.

The tool driver 2 includes a rotation driver 21, a pin driver 22, a shoulder driver 23, and a clamp driver 24. The rotation driver 21 includes a motor, a driving gear, and the like, and rotatably drives the pin 11 and the shoulder 12 about the rotation axis R. The pin driver 22 is a mechanism that causes the pin 11 to advance and retract, or to move up and down along the rotation axis R. The pin driver 22 drives the pin 11 so that the pin 11 is plunged into the overlapping part 30 and retracted from the overlapping part 30. The shoulder driver 23 is a mechanism that causes the shoulder 12 to advance and retract along the rotation axis R, and to be plunged into and retracted from the overlapping part 30. The clamp driver 24 is a mechanism that causes the clamp 13 to advance and retract along the rotation axis R. The clamp driver 24 moves the clamp 13 toward the overlapping part 30 and presses the overlapping part 30 against the backup 15. At this time, a pressing force of the spring 14 acts.

The controller C includes a microcomputer or the like, and controls operation of each unit of the tool driver 2 by executing a predetermined control program. Specifically, the controller C controls the rotation driver 21 to cause the pin 11 and the shoulder 12 to perform a required rotation operation. The controller C also controls the pin driver 22, the shoulder driver 23, and the clamp driver 24 to cause the pin 11, the shoulder 12, and the clamp 13, respectively, to perform required advancing and retracting operation.

[Method for Using Double-Acting Tool]

Next, a general method for using a double-acting tool for friction stir spot welding such as the tool 1 exemplified in the present embodiment will be described. The method for using the tool roughly includes a pin-preceding process of antecedently plunging the pin 11 of the tool 1 into an overlapping part of a welding member and a shoulder-preceding process of antecedently plunging the shoulder 12 into the overlapping part of the welding member. The embodiment of the present disclosure described later uses the pin-preceding process.

Figure 2:
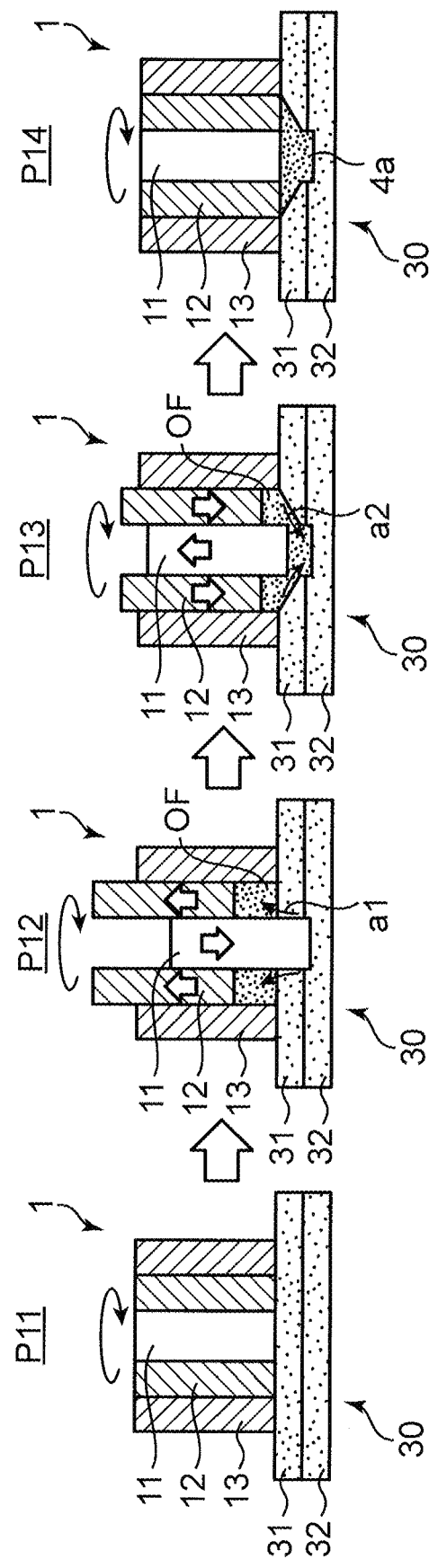
FIG. 2 is a diagram illustrating a pin-preceding process of preliminarily plunging a pin into an overlapping part of a welding member by using a double-acting tool for friction stir spot welding.

FIG. 2 is a diagram illustrating processes P11 to P14 of a friction stir spot welding method by the pin-preceding process. FIG. 2 briefly illustrates a process in which friction stir spot welding is performed on the overlapping part 30 between the first member 31 and the second member 32. The process P11 illustrates a preheating step of the overlapping part 30. The pin 11 and the shoulder 12 are rotated around the axis at a predetermined rotation speed while the tool 1 is in contact at its lower end with a surface of the first member 31.

The process P12 illustrates a plunging step of the pin 11. As indicated by a white arrow in FIG. 2, the pin 11 is lowered to be plunged into the overlapping part 30, while the shoulder 12 is raised, or retracted. This operation stirs a material in a plunging region of the pin 11. As indicated by an arrow a1, an overflow material OF overflowed from the overlapping part 30 by the plunging is released to an annular region between the pin 11 and the clamp 13 generated by the retraction of the shoulder 12.

The process P13 illustrates a backfill step of the overflow material OF. The backfill step causes the pin 11 to be raised and retracted while causing the shoulder 12 to be lowered. When the shoulder 12 is lowered, the overflow material OF released to the annular region is backfilled to the plunging region of the pin 11 as indicated by an arrow a2.

The process P14 illustrates a leveling step. The pin 11 and the clamp 13 are rotated to smooth a spot welding part while having respective lower end surfaces returned to a height position of the surface of the first member 31. The above processes form a stirred weld 4a in which the first member 31 and the second member 32 are spot-welded in the overlapping part 30.

Figure 3:
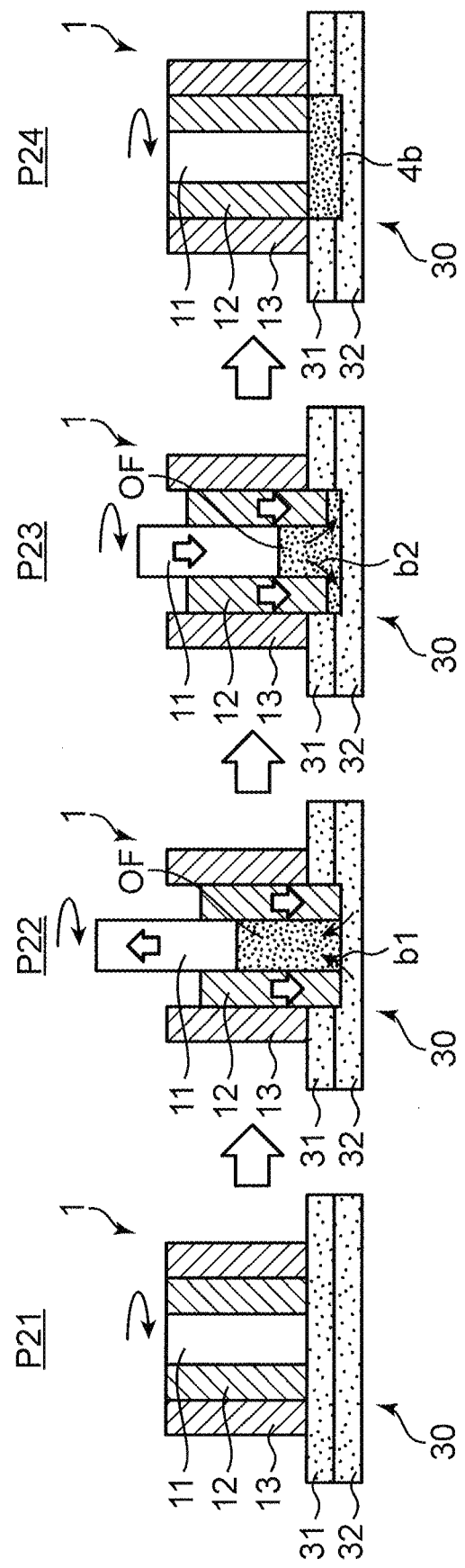
FIG. 3 is a diagram illustrating a shoulder-preceding process of preliminarily plunging a shoulder into an overlapping part of a welding member by using the tool above.

FIG. 3 is a diagram illustrating processes P21 to P24 of the friction stir spot welding method by the shoulder-preceding process. The process P21 is a preheating step of the overlapping part 30 as with the process P11 described above. The process P22 illustrates a plunging step of the shoulder 12. The plunging step causes the shoulder 12 to be lowered to be plunged into the overlapping part 30 while causing the pin 11 to be raised, or retracted. This operation causes a material in a plunging region of the shoulder 12 to be stirred as indicated by an arrow b1. Then, an overflow material OF overflowing from the overlapping part 30 by the plunging is released to a hollow space of the shoulder 12 generated by the retraction of the pin 11.

The process P23 illustrates a backfill step of the overflow material OF. The backfill step causes the shoulder 12 to be raised and retracted while causing the pin 11 to be lowered. When the pin 11 is lowered, the overflow material OF released to the hollow space is backfilled to the plunging region of the shoulder 12 as indicated by an arrow b2. The process P24 illustrates a leveling step as with the process P14 described above. The above processes form a stirred weld 4b.

When the two processes described above are performed using the double-acting tool 1 of the same size, the stirred weld 4b formed by the shoulder-preceding process can have a diameter larger than that of the stirred weld 4a formed by the pin-preceding process. Thus, when the first member 31 and the second member 32 are each made of a metal material such as an aluminum alloy, using the shoulder-preceding process is advantageous from the viewpoint of improving and stabilizing strength of the weld. However, the research of the present inventors reveals that when the first member 31 and the second member 32 are each a thermoplastic resin molding in which a fiber material as a reinforcing material is mixed, welding strength can be improved by using the pin-preceding process. Hereinafter, a specific example of the friction stir spot welding method according to the embodiment of the present disclosure, in which a fiber-reinforced thermoplastic resin molding is to be welded, will be described.

[Friction Stir Spot Welding Method According to Embodiment]

Figure 4:
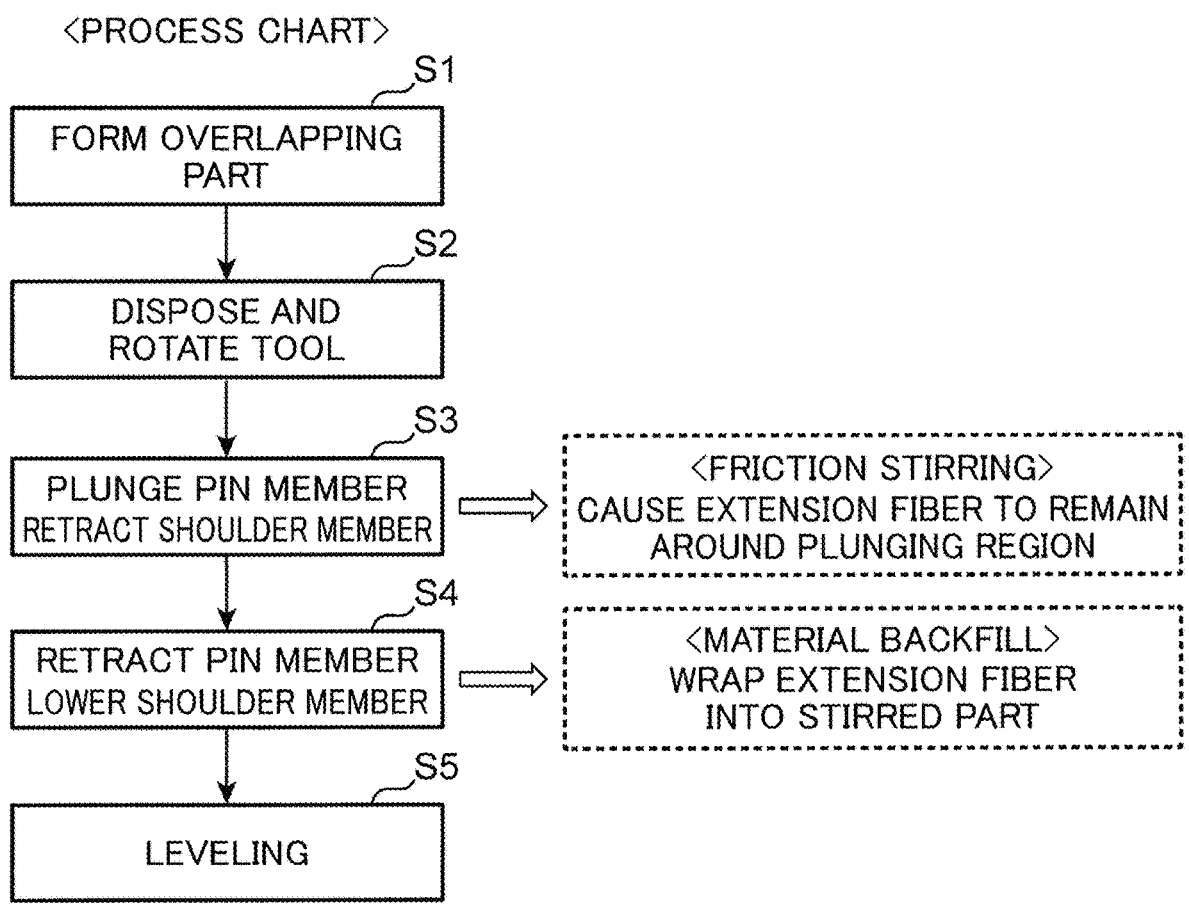
FIG. 4 is a diagram illustrating a process chart of a friction stir spot welding method according to an exemplary embodiment of the present disclosure.

FIG. 4 is a diagram illustrating a process chart of the friction stir spot welding method according to the embodiment of the present disclosure. The friction stir spot welding method of the present embodiment is used to weld the first member 31 and the second member 32, which are each made of a thermoplastic resin molding mixed with a fiber material, and includes the following steps S1 to S5.

Step S1: The overlapping part 30 is formed in which the first member 31 and the second member 32 are to be welded.

Step S2: The tool 1 is disposed and rotated at the spot welding position W of the overlapping part 30.

Step S3: The pin 11 is plunged into the overlapping part 30 to perform friction stir.

Step S4: The shoulder 12 is lowered to backfill the material.

Step S5: The friction stirred part is leveled.

In the description above, step S2 corresponds to the "preheating step" of the process P11 illustrated in FIG. 2, step S3 corresponds to the "plunging step" of the process P12, step S4 corresponds to the "backfill step" of the process P13, and step S5 corresponds to the "leveling step" of the process P14. However, thermoplastic resin moldings each mixed with a fiber material are to be welded in the present embodiment, so that steps S3 and S4 are configured to perform respective actions different from the conventional simple "plunging step" and "backfill step". That is, step S3 is performed to extend the fiber materials mixed in the first member 31 and the second member 32 from the periphery of the plunging region of the pin 11 into the overlapping part 30. Then, step S4 is performed to form the stirred weld so that the extended fiber materials wrap a backfill material.

Figure 5:
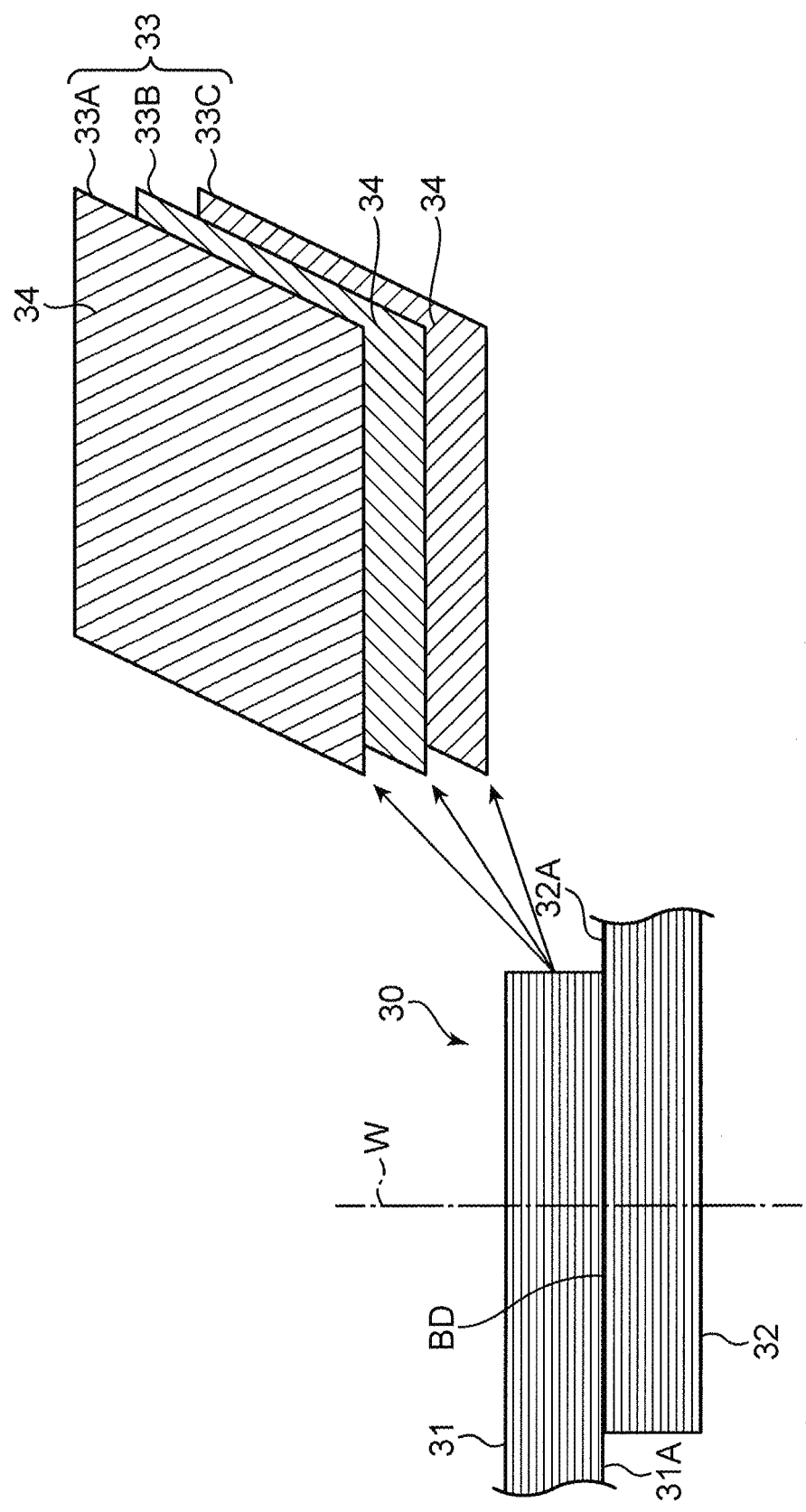
FIG. 5 is a diagram illustrating a configuration of a first member and a second member to be welded by friction stir spot welding, and a step of forming an overlapping part between the first member and the second member.

FIG. 5 is a diagram illustrating a forming step of the overlapping part 30 in step S1. Step S1 is performed to dispose the first member 31 and the second member 32 so that the overlapping part 30 is formed in which the first member 31 and the second member 32 overlap each other while being at least partially in contact with each other. The present embodiment exemplifies the overlapping part 30 in which a part of the first member 31 in a plate shape and a part of the second member 32 in a plate shape are vertically overlapped with each other. The overlapping part 30 may be an overlapping part between a plate and a frame or a columnar member, an overlapping part between frames, or the like. The overlapping part 30 is provided with a faying surface BD in which a welding surface 31A that is a lower surface of the first member 31 and a welding surface 32A that is an upper surface of the second member 32 are in direct contact with each other. The overlapping part 30 described above includes the spot welding position W required at which the first member 31 and the second member 32 are welded by friction stir spot welding.

As described above, the thermoplastic resin molding mixed with the fiber material is used as each of the first member 31 and the second member 32. Examples of the molding include a molding obtained by mixing short fibers or long fibers as the fiber reinforcements with a thermoplastic resin, a fiber array body in which continuous fibers are arrayed in a predetermined direction, and a molding obtained by impregnating a woven fabric of continuous fibers with a thermoplastic resin. The present embodiment shows an example of the first member 31 and the second member 32 each of which uses a molding formed by stacking prepregs, which are each a sheet in which an array of continuous fibers is impregnated with a thermoplastic resin, in multiple layers. At least the first member 31 on a side where the pin 11 is plunged may be a thermoplastic resin molding mixed with a fiber material, and the second member 32 may be a thermoplastic resin molding without containing a fiber material.

FIG. 5 illustrates a part of a sheet laminate 33 constituting the first member 31. The sheet laminate 33 includes a first sheet layer 33A, a second sheet layer 33B, and a third sheet layer 33C each made of a sheet in which an array of continuous fibers is impregnated with a thermoplastic resin. The first sheet layer 33A is a sheet having a thickness of about 0.1 mm to 0.5 mm, in which many continuous fibers 34 are arrayed in a predetermined array direction, and the array is impregnated with a thermoplastic resin and integrated. The second sheet layer 33B and the third sheet layer 33C are each a sheet similar to the above, but are different from each other in array direction of the continuous fibers 34. As described above, when three sheets different from each other in three-axial direction of the array of the continuous fibers 34 are stacked in multiple layers, for example, the first member 31 has pseudo isotropy. The second member 32 is also a plate made of a multilayer laminate of sheets similar to the first member 31.

Available examples of the continuous fibers 34 include carbon fibers, glass fibers, ceramic fibers, metal fibers, and organic fibers. Although FIG. 5 exemplifies the sheet in which the continuous fibers 34 are arrayed in one direction, a fabric type sheet may be used in which a woven fabric is formed using continuous fibers as the warp and the weft and then impregnated with a thermoplastic resin. Instead of the continuous fibers 34, a sheet or a plate in which long fibers having a length of about 2 mm to 20 mm are mixed with a thermoplastic resin can also be used. Examples of the thermoplastic resin include polypropylene (PP), polyethylene (PE), polyamide (PA), polystyrene (PS), polyaryletherketone (PAEK), polyacetal (POM), polycarbonate (PC), polyethylene terephthalate (PET), polyetheretherketone (PEEK), polyphenylene sulfide (PPS), ABS resin, and thermoplastic epoxy resin.

The first member 31 and the second member 32 are each preferably entirely formed of a laminate of sheets (moldings) in each of which an array of continuous fibers 34 is impregnated with a thermoplastic resin, but are each may be partially formed of a sheet as described above. For example, a layer formed of a thermoplastic sheet without containing reinforcing fibers or a thermoplastic sheet mixed with reinforcing fibers that are not continuous fibers may be interposed between the corresponding first to third sheet layers 33A to 33C illustrated in FIG. 5.

Figure 6:
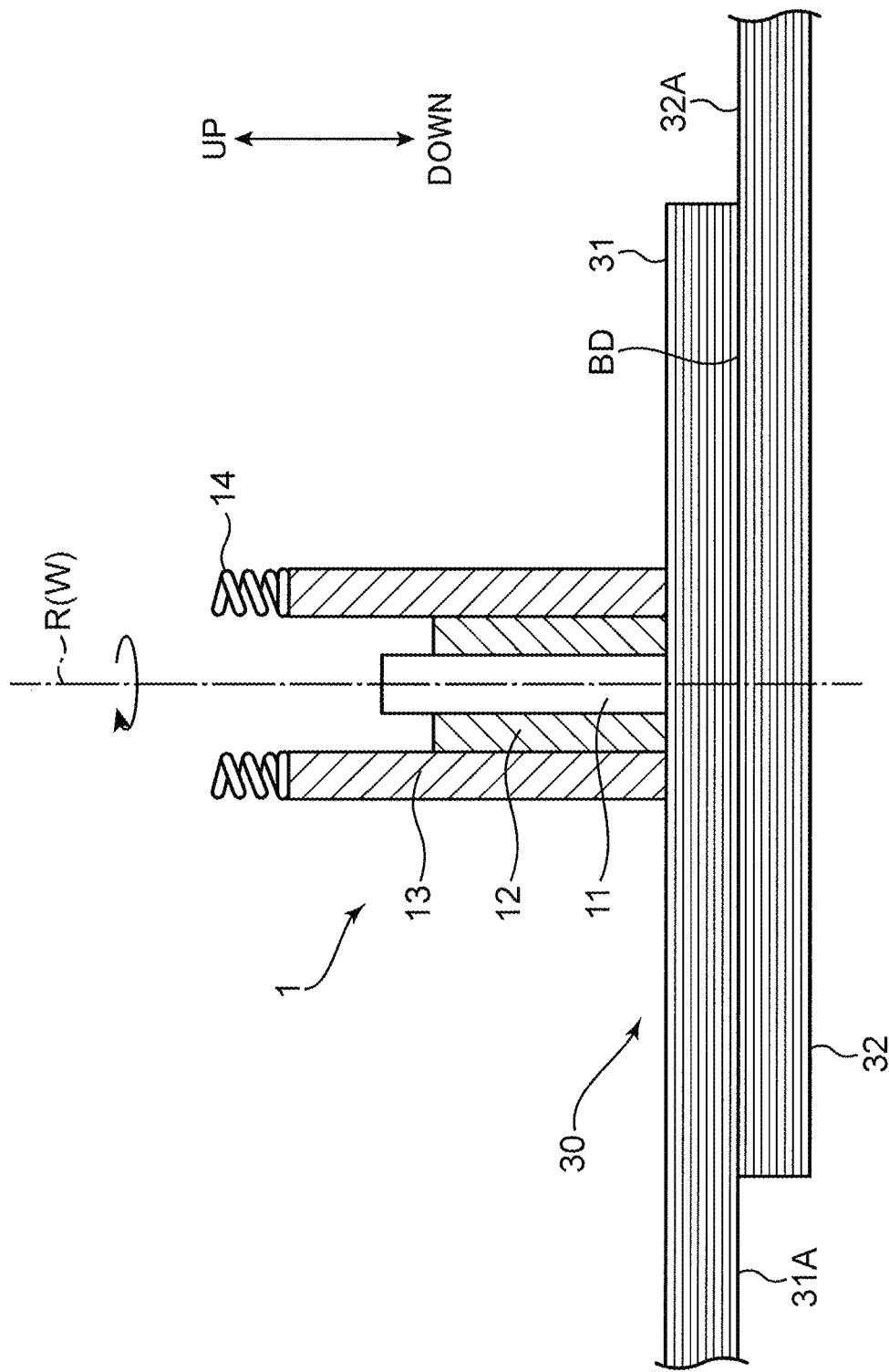
FIG. 6 is a sectional view illustrating a step of disposing a tool against the overlapping part.

FIG. 6 is a sectional view illustrating a tool disposing step in step S2. In step S2, the tool 1 is disposed against the overlapping part 30 such that the rotation axis R of the tool 1 is along an overlapping direction of the first member 31 and the second member 32, or the vertical direction. At this time, the lower end surface of the tool 1 is brought into contact with an upper surface of the first member 31 while the rotation axis R is aligned with the predetermined spot welding position W. The clamp 13 presses the overlapping part 30 against the backup 15 with the pressing force of the spring 14. After completion of positioning, the rotation driver 21 illustrated in FIG. 1 rotates the pin 11 and the shoulder 12 about the rotation axis R. This rotation preheats the overlapping part 30 in a region where the pin 11 and the shoulder 12 are in contact with each other.

Figure 7:
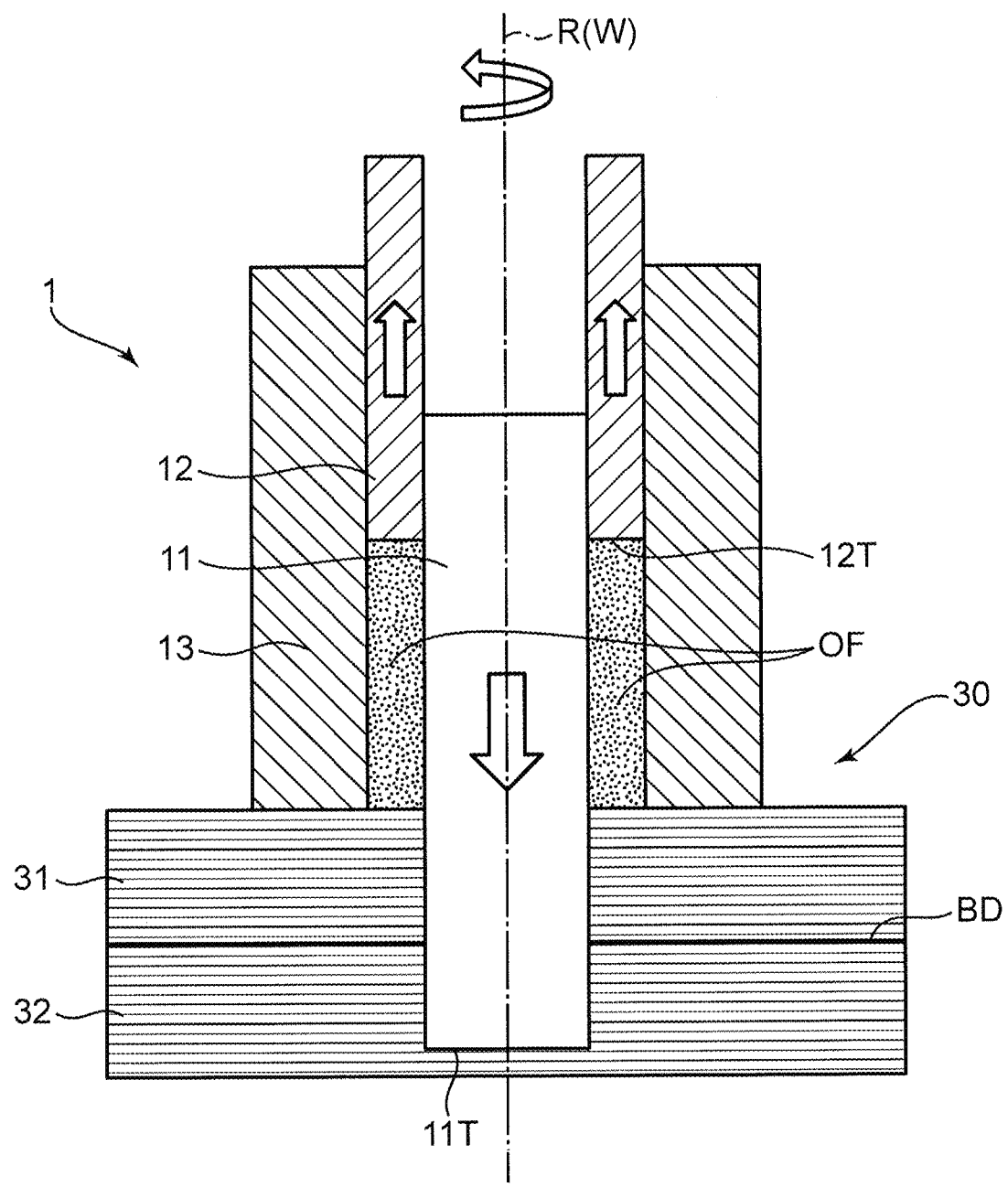
FIG. 7 is a sectional view illustrating a step of plunging a pin into the overlapping part.

FIG. 7 is a sectional view illustrating the plunging step of the pin 11 in step S3. In step S3, the pin driver 22 lowers the pin 11 along the rotation axis R to plunge the pin 11 into the overlapping part 30. Then, the shoulder driver 23 raises the shoulder 12 to retract the shoulder 12 from the overlapping part 30 in the rotation axis R direction. The clamp 13 is immovable. When the pin 11 rotating is plunged into the overlapping part 30, the overlapping part 30 is friction-stirred in the plunging region of the pin 11 to soften a resin molding material in the region. As a matter of course, the continuous fibers 34 included in the plunging region are also pulverized.

The retraction of the shoulder 12 causes an annular region to be formed between an outer peripheral surface of the pin 11 and an inner wall surface of the hollow part of the clamp 13. The overflow material OF, which is the resin molding material overflowing from the overlapping part 30 due to the plunging of the pin 11, moves upward along the outer peripheral surface of the pin 11 to be released to the annular region.

The present embodiment allows the overlapping part 30 to be formed with the first member 31 as an upper member and the second member 32 as a lower member. The pin 11 is plunged from above the upper surface of the first member 31. The pin 11 is lowered until a lower end 11T of the pin 11 passes through the first member 31 being the upper member and penetrates partway into the second member 32 being the lower member in its thickness direction. The pin 11 is desirably lowered until the lower end 11T penetrates into the second member 32 by half or more of a thickness of the second member.

Figure 8:
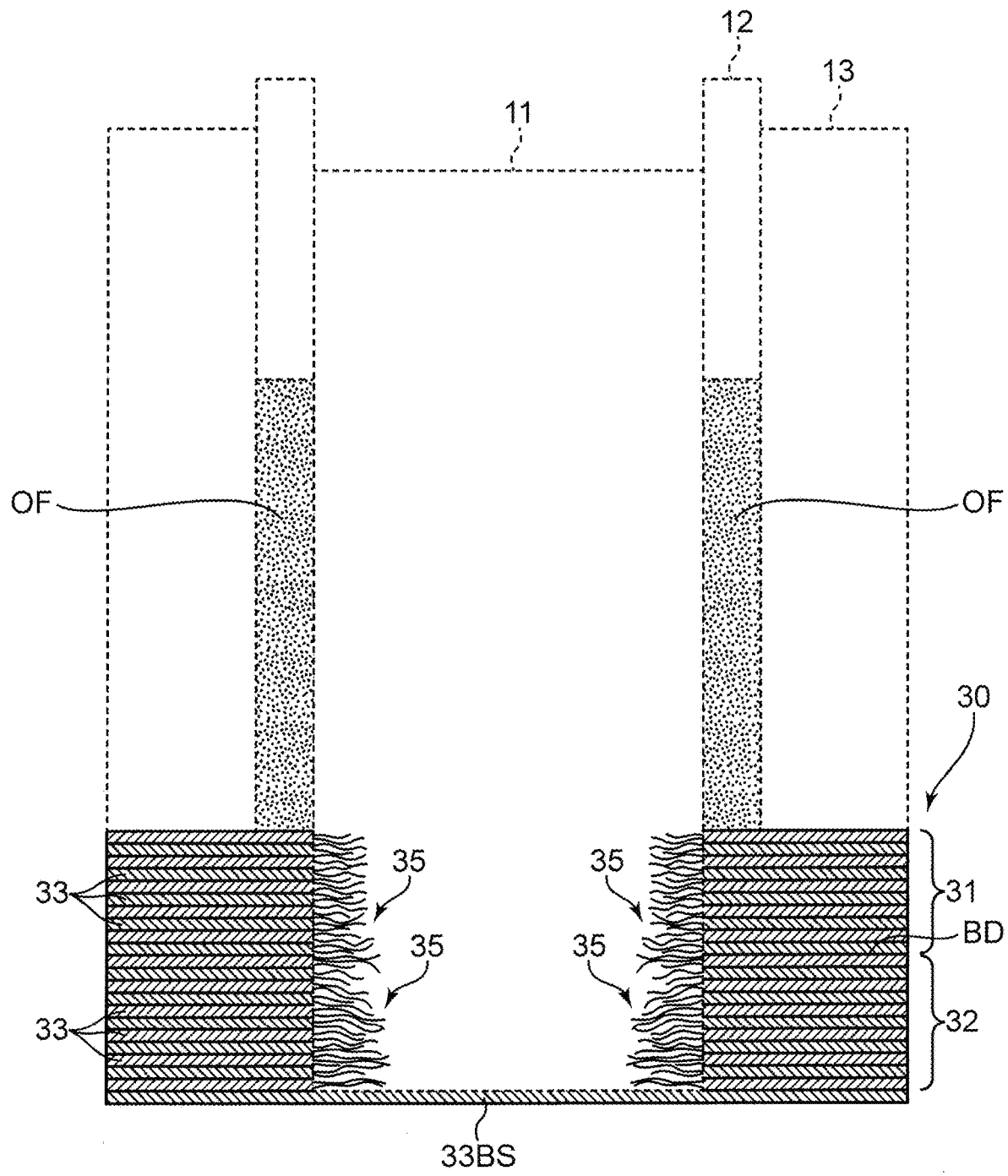
FIG. 8 is a sectional view of the overlapping part when the tool is removed at timing of the state illustrated in FIG. 7.

FIG. 8 is a sectional view of the overlapping part 30 when the tool 1 is removed at timing of the state illustrated in FIG. 7. FIG. 8 indicates positions of the pin 11, the shoulder 12, and the clamp 13 before being removed with dotted lines. FIG. 8 illustrates an example in which the pin 11 passes through the first member 31 and is plunged up to a lowermost layer sheet 33BS of the sheet laminate 33 of the second member 32. The plunging region of the pin 11 is hollowed in the overlapping part 30. The overflow material OF is temporarily retracted above s peripheral edge of the plunging region hollowed.

As illustrated in FIG. 8, extension fibers 35 remain around the plunging region of the pin 11 in the overlapping part 30, in other words, on an inner peripheral wall of the hollowed region. The extension fibers 35 are the continuous fibers 34 in the overlapping part 30 including the first member 31 and the second member 32, the continuous fibers 34 extending from the inner peripheral wall of the plunging region of the pin 11 into the hollowed region. It has been found that plunging the pin 11 having a diameter of 9 mm, for example, causes the extension fibers 35 to extend from the inner peripheral wall of the plunging region by a length of about 1 mm to 2 mm. FIG. 8 illustrates the extension fibers 35 with exaggerated lengths for easy understanding.

The present embodiment shows the first member 31 and the second member 32 that are to be welded and are each formed of the sheet laminate 33 obtained by stacking sheets in each of which an array of continuous fibers 34 is impregnated with a thermoplastic resin. When the pin 11 is plunged into the sheet laminate 33 as described above while being rotated, the continuous fibers 34 are also stirred as the thermoplastic resin is friction-stirred in the plunging region. However, the continuous fibers 34 are not neatly cut at a boundary between the plunging region and a periphery thereof, and partially extend from the boundary. That is, the extension fibers 35 remain on the inner peripheral wall of the plunging region.

The present embodiment uses the sheet laminate 33 in which the continuous fibers 34 are arrayed in multi-axis (three-axis) directions different from each other (illustrated in FIG. 5), so that the extension fibers 35 extend from substantially the entire circumference of the inner peripheral wall of the plunging region. The plunging region finally becomes the stirred weld 4 at which the first member 31 and the second member 32 are welded. As will be described in detail later, the welding strength can be improved by wrapping the extension fibers 35 into the resin material constituting the stirred weld 4.

Figure 9:
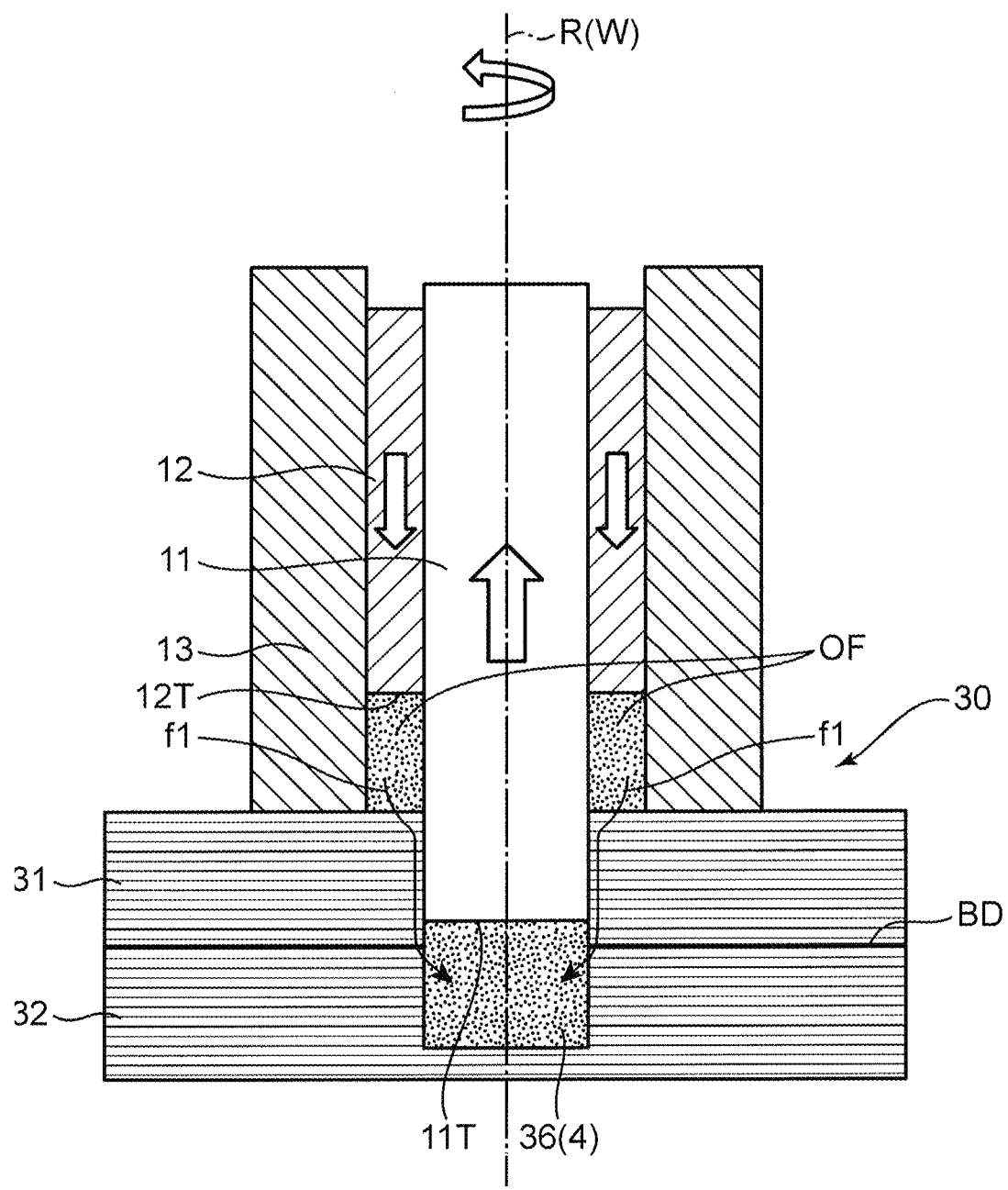
FIG. 9 is a sectional view illustrating a step of lowering a shoulder.

FIG. 9 is a sectional view illustrating the backfill step in step S4. In step S4, the pin driver 22 raises the pin 11 along the rotation axis R to retract the pin 11 from the overlapping part 30. On the other hand, the shoulder driver 23 lowers the shoulder 12 to bring the shoulder 12 closer to the overlapping part 30 in the rotation axis R direction. FIG. 9 illustrates a state in which the lower end 11T of the pin 11 is raised to near the faying surface BD. Lowering the shoulder 12 causes the overflow material OF temporarily retracted to the annular region (surrounding region) between the pin 11 and the clamp 13 to be backfilled to the plunging region.

The annular region where the overflow material OF is temporarily retracted has a positional relationship with the plunging region where the pin 11 is plunged, in which the annular region exists around the plunging region in plane view in the rotation axis R direction. Thus, the overflow material OF during the backfill flows in a direction from the annular region toward a center of the plunging region, the center being a position of the rotation axis R, as indicated by arrows f1 in FIG. 9.

Figure 10:
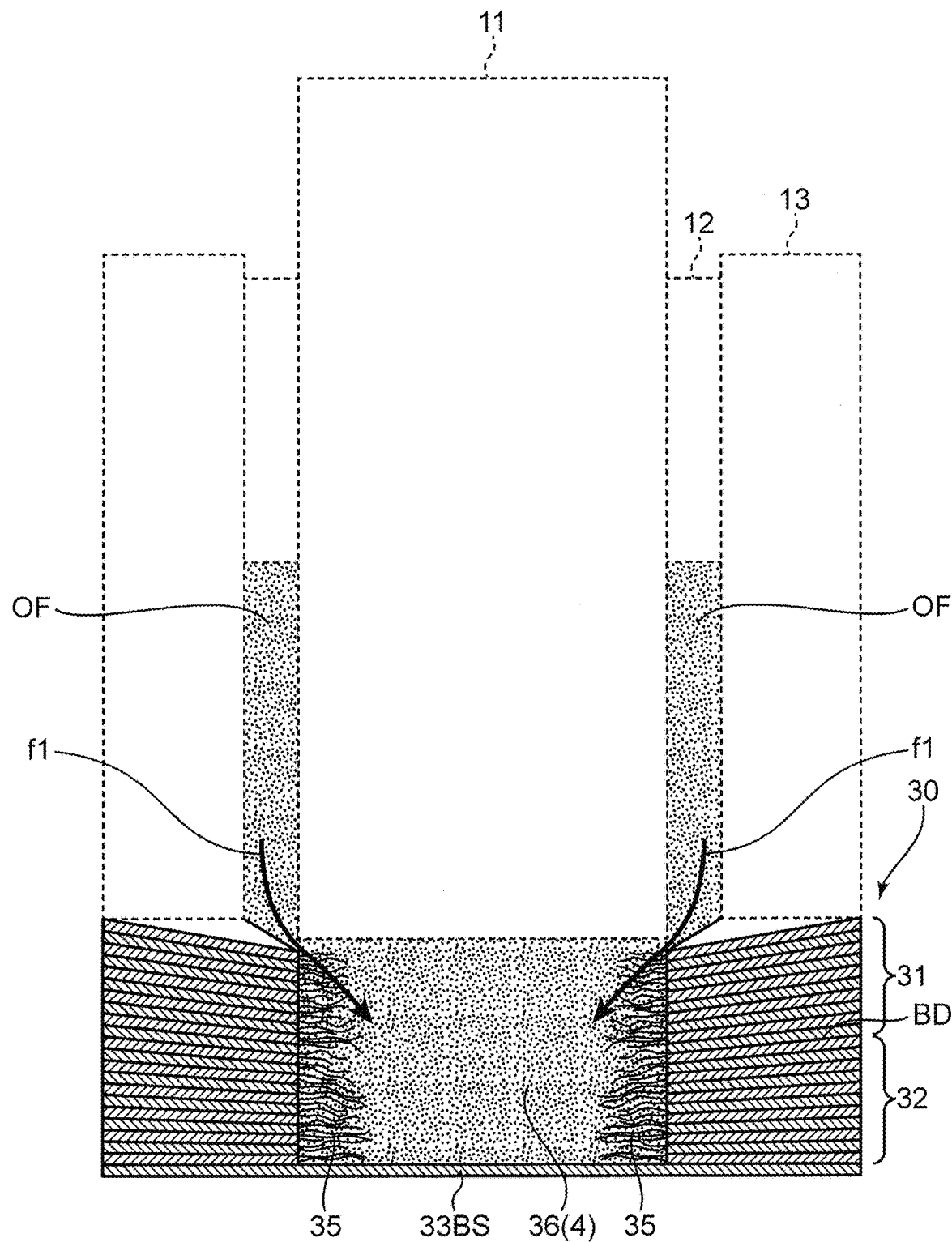
FIG. 10 is a sectional view of the overlapping part when the tool is removed at timing of the state illustrated in FIG. 9.

FIG. 10 is a sectional view of the overlapping part 30 when the tool 1 is removed at timing of the state illustrated in FIG. 9. FIG. 10 indicates positions of the pin 11, the shoulder 12, and the clamp 13 before being removed with dotted lines. The overflow material OF pushed by a lower end 12T of the shoulder 12 flows along the arrows f1 and flows into the plunging region as a backfill material 36. That is, a space generated by rising of the pin 11 is sequentially filled with the backfill material 36. When the backfill material 36 is cured, the stirred weld 4 is formed in which the first member 31 and the second member 32 are welded.

As described above, the extension fibers 35 remain on the inner peripheral wall of the plunging region. The overflow material OF flows toward the center of the plunging region as indicated by the arrows f1. Thus, when the overflow material OF is backfilled from the annular region to the plunging region, the extension fibers 35 are wrapped. That is, the overflow material OF flows along an extending direction of the extension fibers 35, so that the extension fibers 35 are not pushed back radially outward of the plunging region. Thus, when operation of lowering the shoulder 12 is performed in this step S4, the overflow material OF overflowed by the plunging of the pin 11, or the backfill material 36 is backfilled while naturally wrapping the extension fibers 35.

Step S4 is preformed from the state illustrated in FIG. 9 such that the pin 11 is further raised until the lower end 11T reaches the upper surface of the first member 31, and the shoulder 12 is lowered until the lower end 12T reaches the upper surface of the first member 31. That is, all of the overflow material OF is backfilled, and the plunging region of the pin 11 is filled with the backfill material 36. Then, the leveling step of step S5 is performed. The leveling step is performed to smooth a surface of a friction-stirred part while allowing the lower end 11T of the pin 11 to be flush with the lower end 12T of the shoulder 12. The backfill material 36 is cooled and solidified to form the stirred weld 4 in which the first member 31 and the second member 32 are welded.

[Structure of Welded Assembly]

Figure 11A:
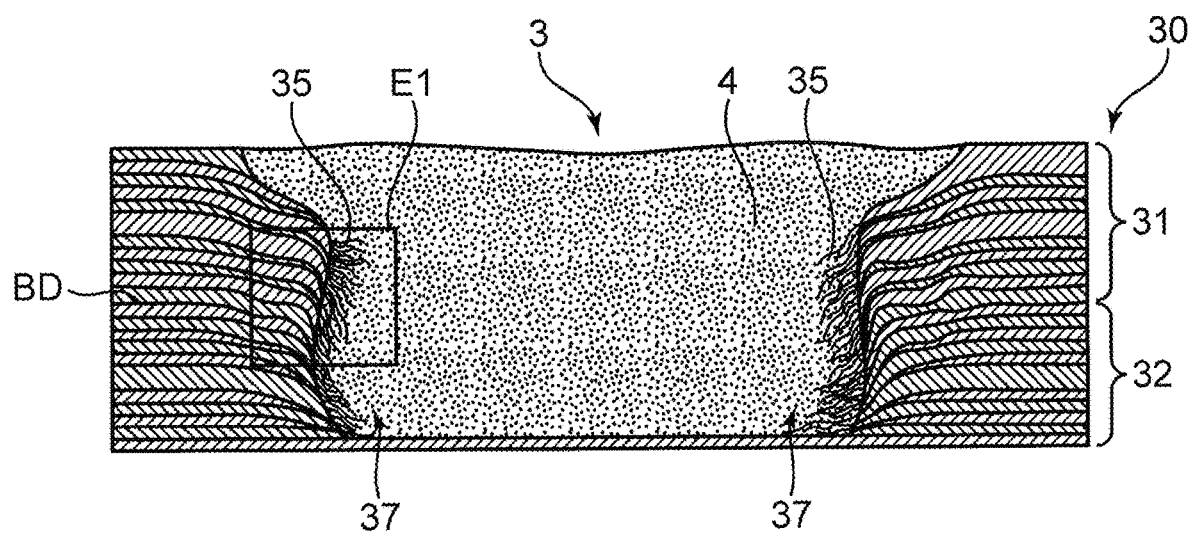
FIG. 11A is a sectional view illustrating a welded assembly of a first member and a second member formed by the friction stir spot welding method of the present embodiment.
Figure 11B:
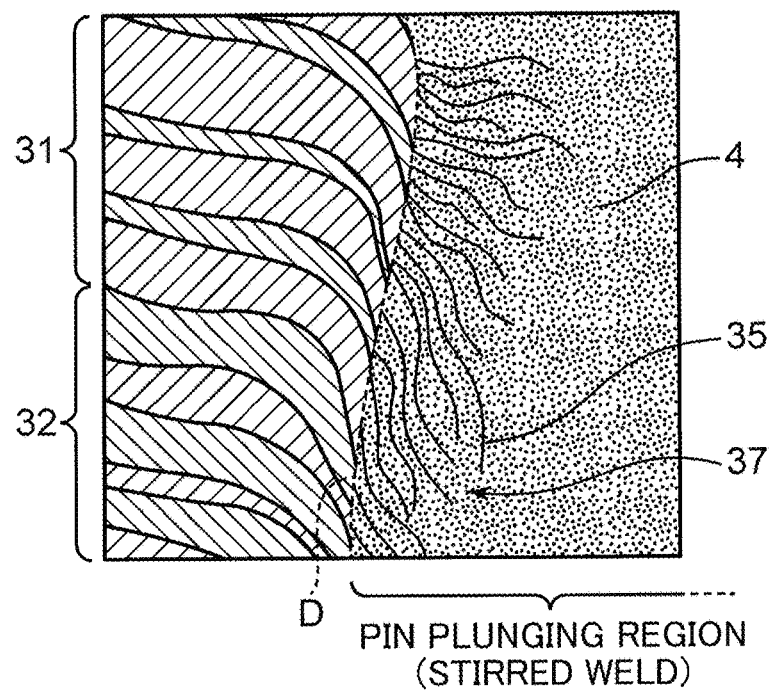
FIG. 11B is an enlarged view of a main part of FIG. 11A.

FIG. 11A is a sectional view illustrating a welded assembly 3 of the first member 31 and the second member 32 formed by the friction stir spot welding method of the present embodiment, and FIG. 11B is an enlarged view of a part E1 in FIG. 11A. The welded assembly 3 includes the overlapping part 30 in which the first member 31 and the second member 32 partially overlap each other while being in contact with each other at the faying surface BD, and the stirred weld 4 provided in the overlapping part 30. The stirred weld 4 is welded by the friction stir spot welding method in steps S1 to S5 described above.

The stirred weld 4 has a substantially columnar shape because it fills the plunging region of the pin 11 in a columnar shape. The stirred weld 4 is provided near its outer peripheral surface with a wrapped part 37. The wrapped part 37 is a part where the extension fibers 35 formed by the continuous fibers 34 in the overlapping part 30 extending from the periphery of the stirred weld 4 are connected to the stirred weld 4. The wrapped part 37 is formed in a state in which the extension fibers 35 enter the inside of the resin material constituting the stirred weld 4, in other words, a state in which the extension fibers 35 are wrapped into the resin material.

FIG. 11B shows a dotted line indicating a boundary D between the stirred weld 4 and a base material part of the overlapping part 30 of the first member 31 and the second member 32 around the stirred weld 4, the base material part being not stirred. The boundary D corresponds to the inner peripheral wall of the plunging region described above. The extension fibers 35 extend substantially from the boundary D to the radial center of stirred weld 4. Additionally, it can be said that the extension fibers 35 are firmly held in the base material part because the extension fibers 35 are ends of the continuous fibers 34 embedded in the base material part.

As described above, the welded assembly 3 of the present embodiment includes the wrapped part 37 formed by allowing the extension fibers 35 firmly held in the base material part to enter the resin material of the stirred weld 4. This structure causes the stirred weld 4 and the base material part of the overlapping part 30, being located around the stirred weld 4, to be not only welded depending on welding between the resins, but also connected by the extension fibers 35. Thus, welding strength between the stirred weld 4, and the base material part of the first member 31 and the second member 32, can be improved in the overlapping part 30.

Comparative Example

Figure 12:
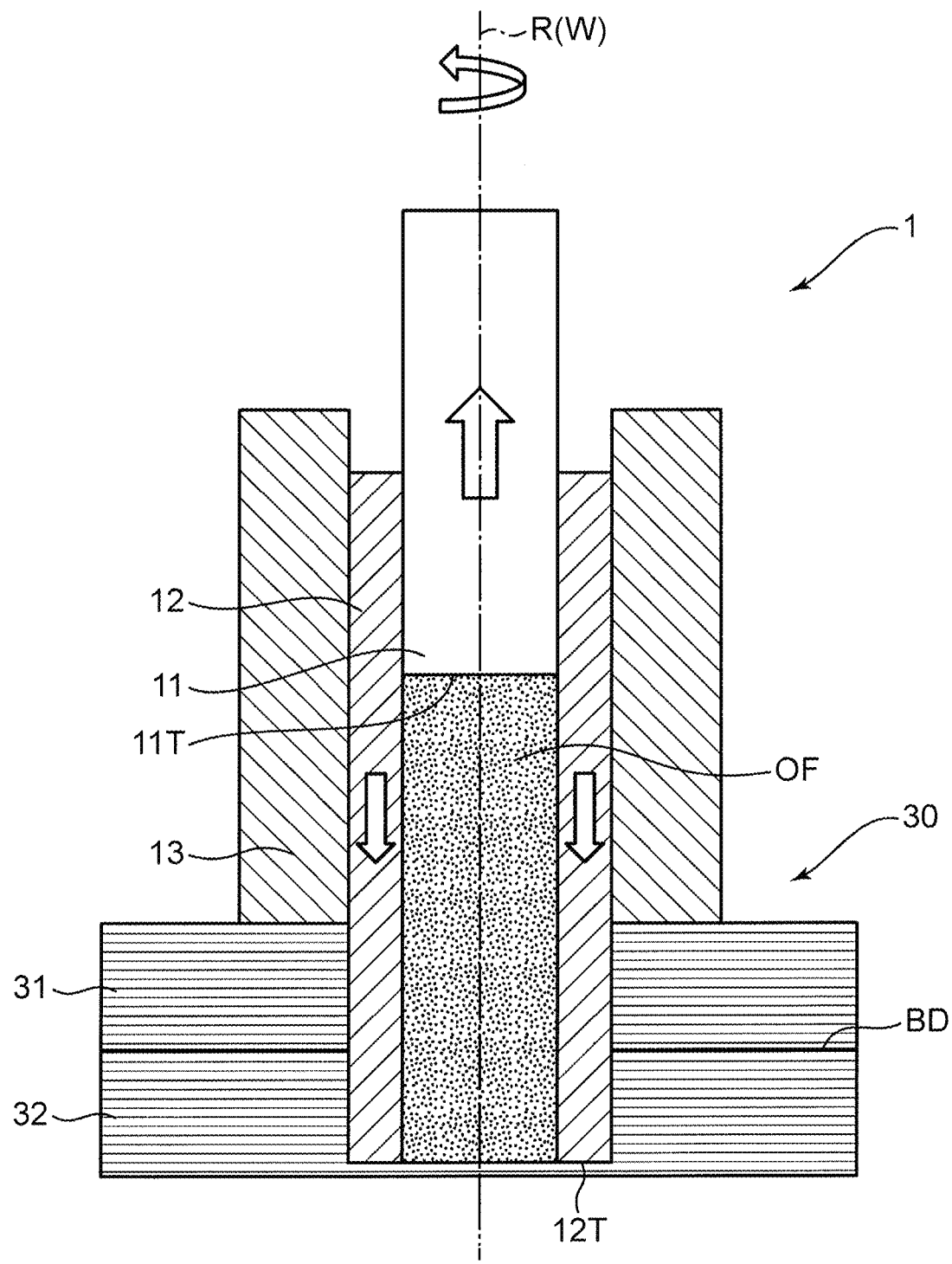
FIG. 12 is a diagram illustrating a friction stir spot welding method of a comparative example while illustrating a step of preliminarily plunging a shoulder into the overlapping part.

Subsequently, a comparative example of the above embodiment will be described with a defect when the shoulder-preceding process illustrated in FIG. 3 is applied to friction stir spot welding of the first member 31 and the second member 32 that are each formed of a thermoplastic resin molding mixed with fiber materials. FIG. 12 is a diagram illustrating a friction stir spot welding method of the comparative example, and is a sectional view illustrating a step of preliminarily plunging the shoulder 12 of the tool 1 into the overlapping part 30 of the first member 31 and the second member 32 as in the above embodiment.

As described above with reference to FIG. 3, the plunging step of the shoulder 12 is performed such that the pin 11 is raised along the rotation axis R while the shoulder 12 rotating is lowered along the rotation axis R. The clamp 13 is immovable. When the shoulder 12 is plunged into the overlapping part 30, the overlapping part 30 is friction-stirred in the plunging region of the shoulder 12 to soften a resin molding material in the region. When the pin 11 is retracted upward, a retraction region is formed in the hollow part of the shoulder 12. The overflow material OF overflowing from the overlapping part 30 due to the plunging of the shoulder 12 is released to the retraction region.

Figure 13:
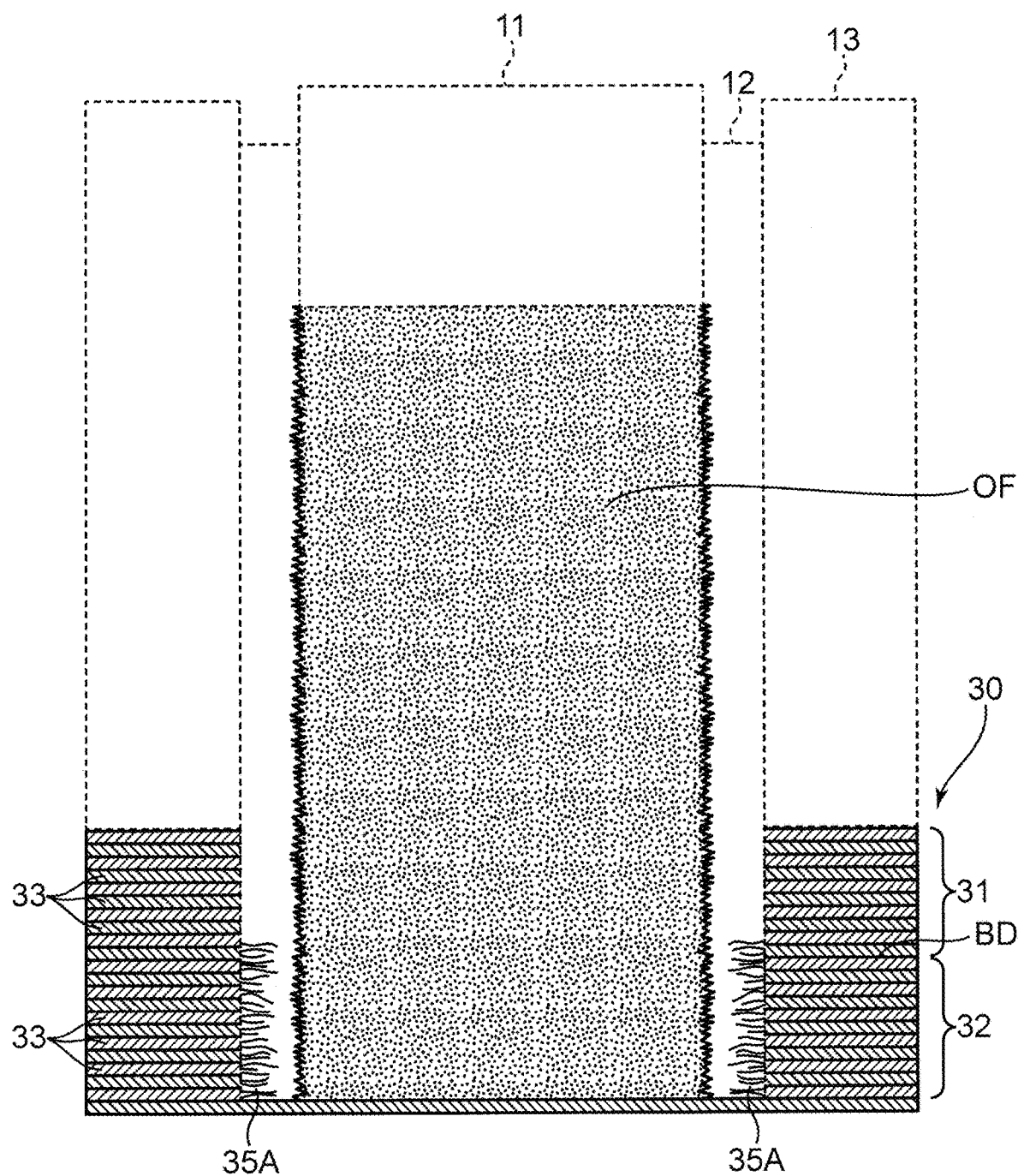
FIG. 13 is a sectional view of the overlapping part when the tool is removed at timing of the state illustrated in FIG. 12.

FIG. 13 is a sectional view of the overlapping part 30 when the tool 1 is removed at timing of the state illustrated in FIG. 12. FIG. 13 illustrates an example in which the shoulder 12 passes through the first member 31 and is plunged up to near a lowermost layer of the sheet laminate 33 of the second member 32. The plunging region of the shoulder 12 in the overlapping part 30 is an annular hollowed region. The overflow material OF is released to a columnar region inside the annular hollowed region. Then, extension fibers 35A remain around the plunging region of the shoulder 12 in the overlapping part 30, the extension fibers 35A being formed when the continuous fibers 34 in the base material part of the overlapping part 30 of the first member 31 and the second member 32 extend to the hollowed region. The extension fibers 35A each have an extended length of about 0.7 mm when the shoulder 12 having a diameter of 9 mm is plunged, and the extended length is shorter than that when the pin 11 is plunged as described above.

Figure 14:
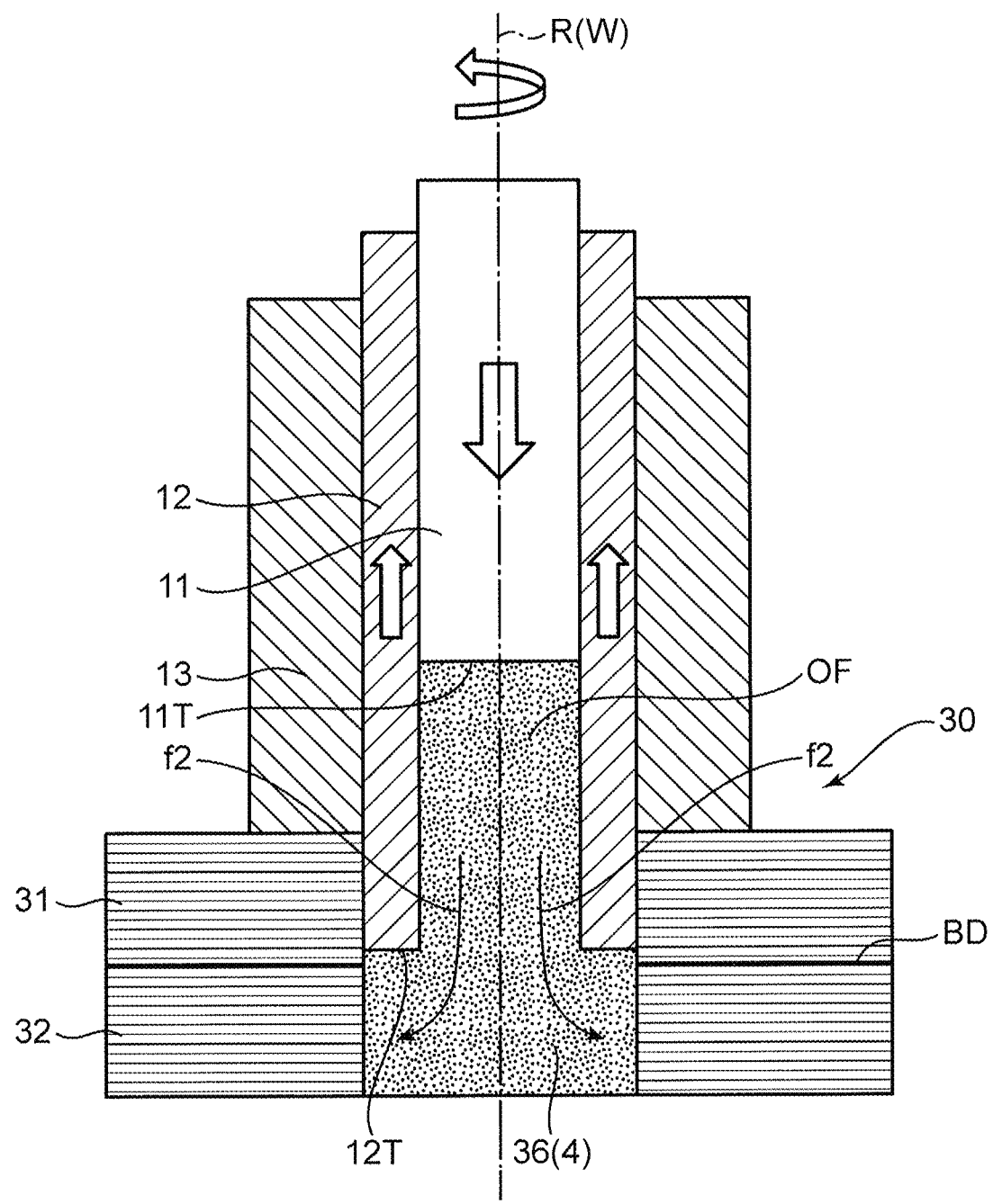
FIG. 14 is a diagram illustrating a friction stir spot welding method of a comparative example, and is a sectional view illustrating a step of lowering a member.

FIG. 14 is a sectional view illustrating the backfill step of the overflow material OF. The backfill step is performed such that the shoulder 12 is raised along the rotation axis R to retract the shoulder 12 from the overlapping part 30. On the other hand, the pin 11 is lowered along the rotation axis R, and the overflow material OF released in the columnar region is backfilled to the annular hollowed region.

The columnar region where the overflow material OF is temporarily retracted has a positional relationship with the annular hollowed region where the shoulder 12 is plunged, in which the columnar region exists inside the annular hollowed region in plan view in the rotation axis R direction. Thus, the overflow material OF during the backfill flows radially outward from the columnar region toward the annular hollowed region as indicated by arrows f2 in FIG. 14. That is, the overflow material OF flows in a direction opposite to the extending direction of the extension fibers 35A from the inner peripheral wall of the plunging region.

Figure 15:
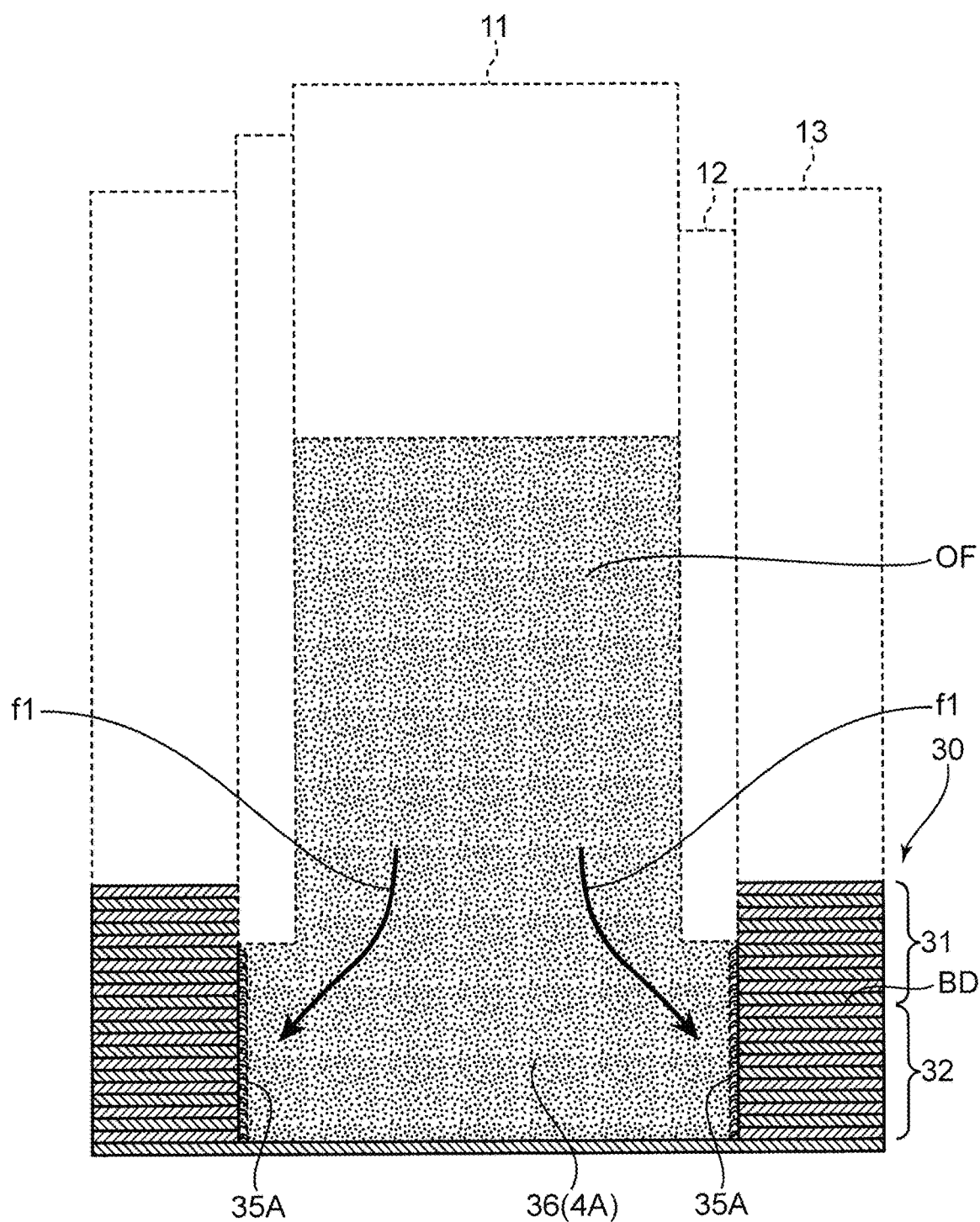
FIG. 15 is a sectional view of the overlapping part when the tool is removed at timing of the state illustrated in FIG. 14.

FIG. 15 is a sectional view of the overlapping part 30 when the tool 1 is removed at timing of the state illustrated in FIG. 14. FIG. 15 indicates positions of the pin 11, the shoulder 12, and the clamp 13 before being removed with dotted lines. The overflow material OF pushed by the lower end 11T of the pin 11 flows along the arrows f2 and flows into the plunging region of the shoulder 12 as the backfill material 36. That is, a space generated by rising of the shoulder 12 is sequentially filled with the backfill material 36. The backfill material 36 finally forms a stirred weld 4A in which the first member 31 and the second member 32 are welded.

As described above, the extension fibers 35A remain on the inner peripheral wall of the plunging region. However, the overflow material OF flows toward the inner peripheral wall of the plunging region, the inner peripheral wall being close to the base material part of the overlapping part 30, as indicated by the arrows f2. This flow causes the extension fibers 35A to be pushed back toward the base material part of an extension base when the overflow material OF is backfilled. Thus, unlike the embodiment previously shown in FIG. 10, the overflow material OF, i.e., the backfill material 36, is hardly able to wrap the extension fibers 35A.

Figure 16A:
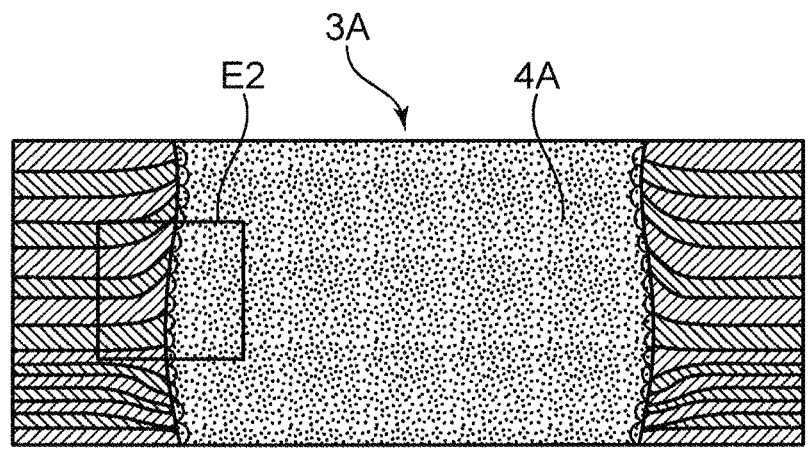
FIG. 16A is a sectional view illustrating a welded assembly of a first member and a second member formed by the friction stir spot welding method of the comparative example.
Figure 16B:
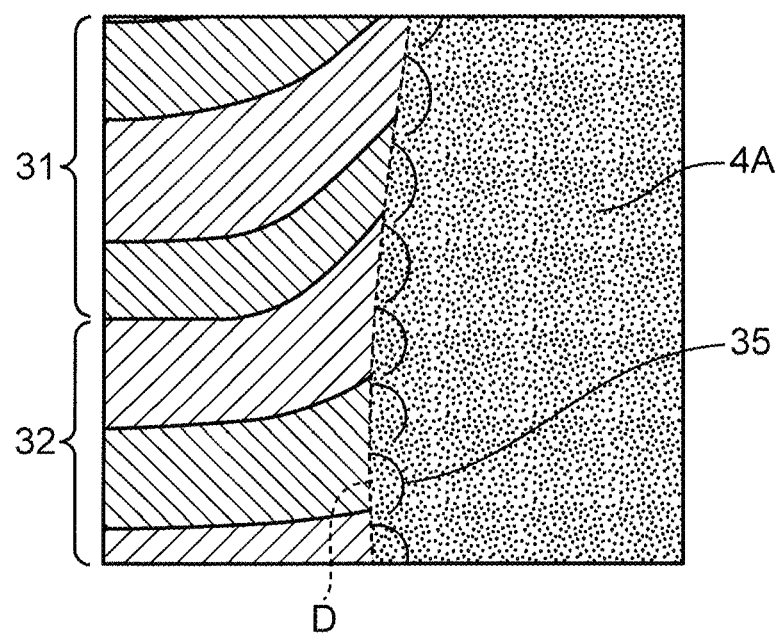
FIG. 16B is an enlarged view of a main part of FIG. 16A.

FIG. 16A is a sectional view illustrating a welded assembly 3A of the first member 31 and the second member 32 formed by the friction stir spot welding method of the comparative example, and FIG. 16B is an enlarged view of a part E2 in FIG. 16A. The welded assembly 3A includes an overlapping part 30 where the first member 31 and the second member 32 overlap each other, and a stirred weld 4A provided in the overlapping part 30. The stirred weld 4A is welded by the friction stir spot welding method by the shoulder-preceding process. The stirred weld 4A does not substantially include the wrapped part 37 as shown in the above embodiment.

FIG. 16B shows a dotted line indicating a boundary D between the stirred weld 4A and a base material part of the overlapping part 30 of the first member 31 and the second member 32 around the stirred weld 4A, the base material part being not stirred. The boundary D corresponds to the inner peripheral wall of the plunging region of the shoulder 12. Unlike the embodiment shown in FIG. 11B, the extension fibers 35A in the comparative example are in a state of being stuck to the boundary D. That is, the extension fibers 35A do not substantially enter the inside of the stirred weld 4A.

The embodiment of FIG. 11B shows the wrapped part 37 that is formed in which the extension fibers 35 are wrapped into the resin material of the stirred weld 4. Thus, the extension fibers 35 bridge the stirred weld 4 and the base material part of the overlapping part 30, so that welding strength between them increases. In contrast, the comparative example does not allow the extension fibers 35A to substantially contribute to welding between the stirred weld 4A and the base material part of the overlapping part 30. That is, the welding between the stirred weld 4A and the base material part depends only on welding between the resins, so that the welding strength between the stirred weld 4A and the base material part is relatively weak.

[Peeling Test of Welded Assembly]

The welded assembly 3 obtained by friction stir spot welding by the pin-preceding process according to the example of the present disclosure illustrated in FIG. 11 and the welded assembly 3A obtained by friction stir spot welding by the shoulder-preceding process according to the comparative example illustrated in FIG. 16 were tested for peel strength in accordance with the test method of the NASM 1312-8. As the first member 31 and the second member 32 serving as welding materials in an example and the comparative example, a quasi-isotropic laminate type continuous fiber CFRTP (Carbon Fiber Reinforced Thermoplastics) material having a thickness of 3.3 mm was used.

The first member 31 and the second member 32 made of the CFRTP material were stacked on each other, and the welded assembly 3 welded by friction stir spot welding by the pin-preceding process shown in the example of FIGS. 7 to 10 and the welded assembly 3A welded by friction stir spot welding by the shoulder-preceding process shown in the comparative example of FIGS. 12 to 15 were manufactured. The example and the comparative example were each tested five times. The example used the pin 11 having a diameter of 9 mm as the tool 1 and the comparative example used the shoulder 12 having an outer diameter of 9 mm as the tool 1 to finish the stirred welds 4 and 4A to be in the same diameter.

The welded article 3 and 3A according to the example and the comparative example shows respective average values below of fracture strength being peel strength between the first member 31 and the second member 32. That is, it was found that the welded article 3 according to the example had about 1.4 times higher fracture strength than the welded article 3A according to the comparative example.

Example (pin-preceding); Fracture strength=2.05 kN

Comparative example (shoulder-preceding); Fracture strength=1.46 kN

Figure 17A:
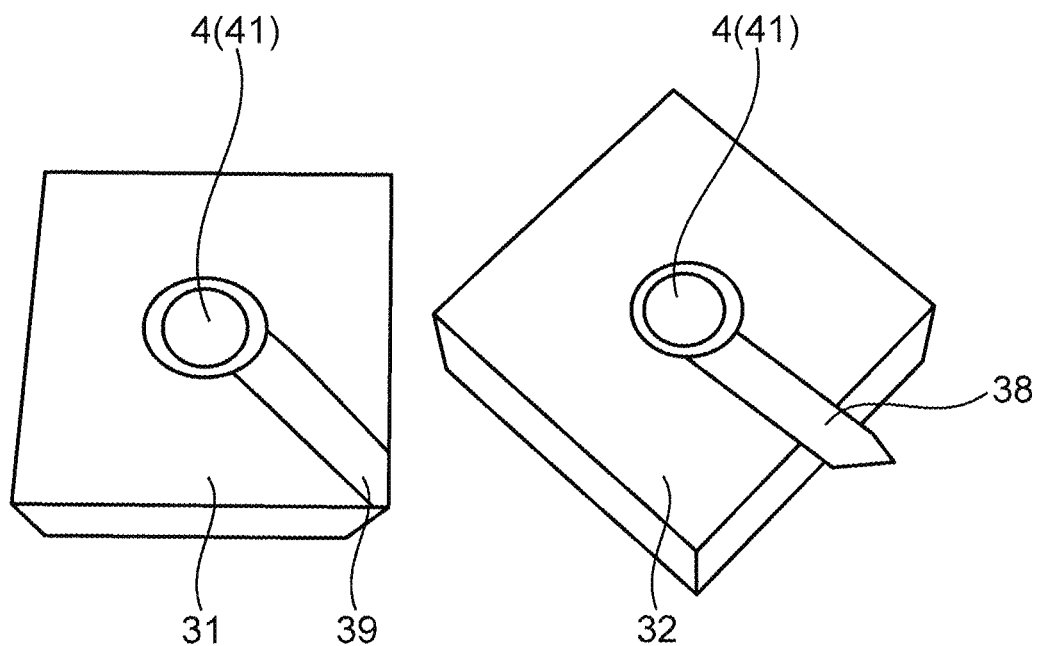
FIG. 17A is a perspective view illustrating a state of a peeling test of a welded assembly according to the present embodiment.
Figure 17B:
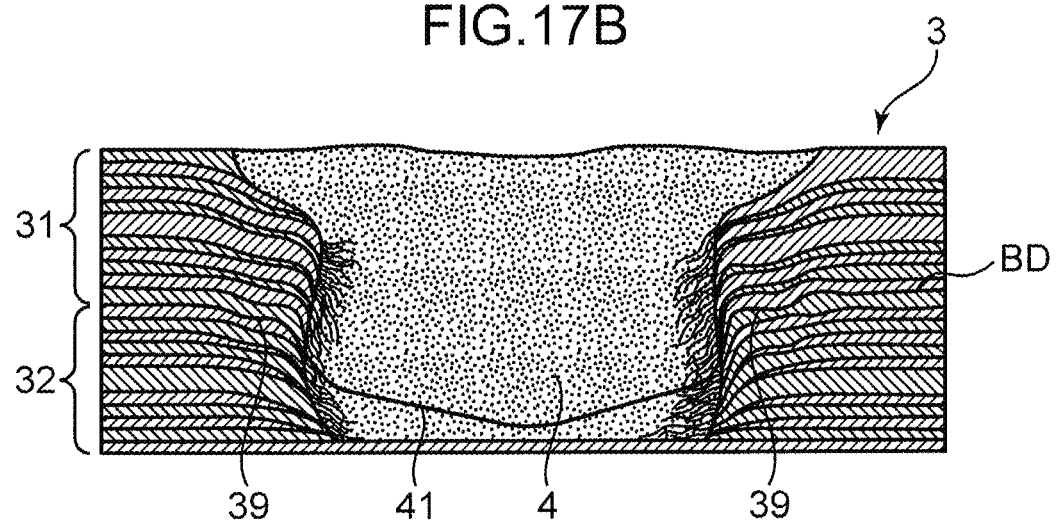
FIG. 17B is a sectional view after the peeling test in FIG. 17A.

FIG. 17A is a perspective view illustrating a state of a peeling test of the welded assembly 3 according to the example, and FIG. 17B is a sectional view after the peeling test. The first member 31 serving as an upper member and the second member 32 serving as a lower member are separated from each other at a peeling part 41 in the stirred weld 4. It is noteworthy that wrapped fiber pieces 38 are attached to peeled pieces close to the second member 32 from the stirred weld 4 as observed from FIG. 17A. The wrapped fiber pieces 38 are the continuous fibers 34 of the first member 31.

That is, when the second member 32 is peeled off from the first member 31, the continuous fibers 34 are peeled by interlayer peeling from a sheet layer near the faying surface BD of the first member 31, and peeled off together with the second member 32 to form the wrapped fiber pieces 38. The wrapped fiber pieces 38 include an interlayer peeling part 39 that appears on peeled pieces on the first member 31 side. The wrapped fiber pieces 38 each have an end part wrapped into the wrapped part 37 of the stirred weld 4 illustrated in FIG. 11B. It is considered that as a result of ingress of the end of each of the wrapped fiber pieces 38 into the region of the second member 32 in the stirred weld 4, the wrapped fiber pieces 38 were peeled together with the second member 32 from the first member 31.

Figure 18A:
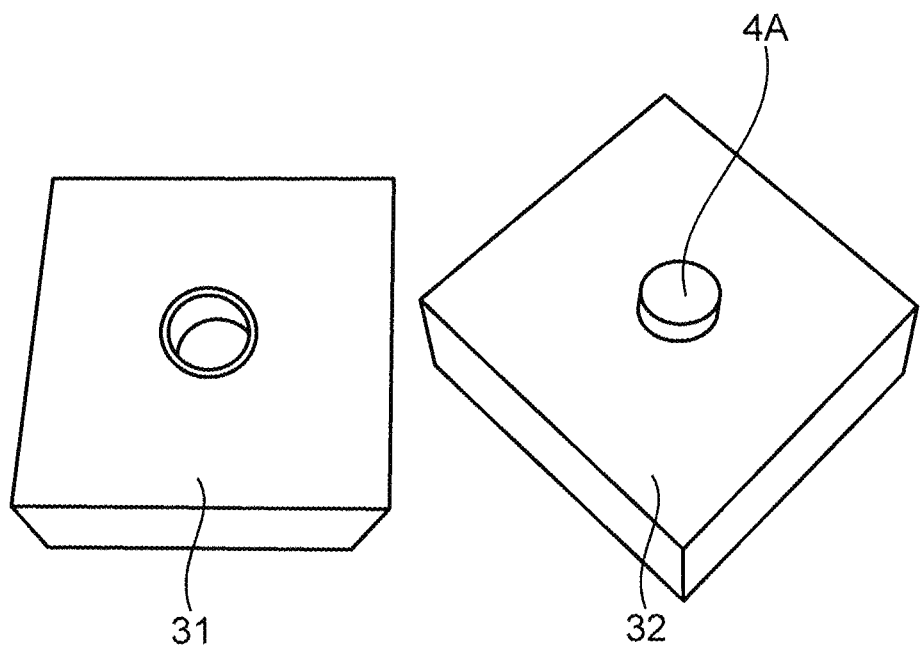
FIG. 18A is a perspective view illustrating a state of a peeling test of a welded assembly according to the comparative example.
Figure 18B:
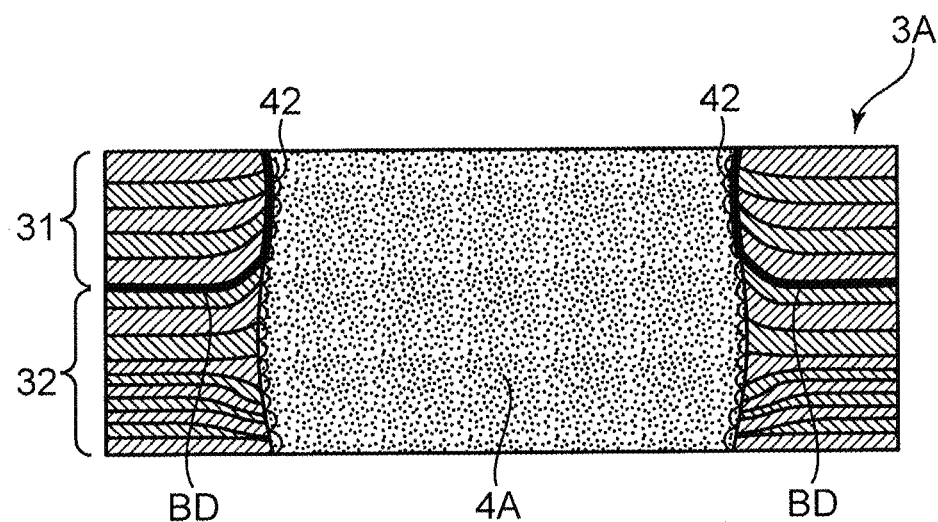
FIG. 18B is a sectional view after the peeling test in FIG. 18A.

FIG. 18A is a perspective view illustrating a state of a peeling test of the welded assembly 3A according to the comparative example, and FIG. 18B is a sectional view after the peeling test. The first member 31 and the second member 32 are separated at a peeling part 42 appearing along an outer periphery of the stirred weld 4A. In other words, both the stirred weld 4A and the first member 31 are peeled "cleanly" at the boundary therebetween. It can be said that this indicates that the extension fibers 35A do not particularly contribute to improvement of the welding strength.

From the above results, it can be said that the welding strength between the stirred weld 4 and the base material part in the welded assembly 3 of the example is acquired by adding strength with which the wrapped fiber pieces 38 are peeled from the first member 31 by interlayer peeling to the welding strength between resin parts of the stirred weld 4 and the base material part. In contrast, the welding strength between the stirred weld 4A and the base material part in the welded assembly 3 of the comparative example depends exclusively on the welding strength between resin parts of the stirred weld 4A and the base material part. These results reveal that the example using the pin-preceding process increases the welding strength between the first member 31 and the second member 32 as compared with the comparative example using the shoulder-preceding process.

[Operation and Effect]

The friction stir spot welding method according to the present disclosure described above is configured to preliminarily plunge the pin 11 into the overlapping part 30 of the first member 31 and the second member 32 by using the double-acting tool 1 for friction stir spot welding to perform friction stir. The plunging region of the pin 11 finally becomes the stirred weld 4, and at least the fiber material mixed with the first member 31 is also stirred together with the resin in the overlapping part 30. However, the fiber material is not neatly cut at the boundary D between the plunging region and a periphery thereof, and partially extend from the boundary D. That is, a state is formed in which the extension fibers 35 remain on the inner peripheral wall of the plunging region of the pin 11.

Thereafter, backfill operation using the shoulder 12 is performed while wrapping the extension fibers 35 with the overflow material OF that is the resin molding material overflowed by the plunging of the pin 11. Thus, the stirred weld 4 is brought into a state where the extension fibers 35 extending from the periphery of the plunging region enter the inside of the stirred weld 4 and are wrapped. That is, the stirred weld 4 and the base material part around the stirred weld 4 are not only welded depending on welding between the resins, but also connected and welded by the extension fibers 35. Thus, the welding strength between the first member 31 and the second member 32 can be improved.

The present embodiment allows a member including a molding in which the continuous fibers 34 are impregnated with a thermoplastic resin to be used as the first member 31 and the second member 32 that are to be welded. Specifically, the first member 31 and the second member 32 each having pseudo isotropy are used, the pseudo isotropy being acquired by forming the sheet laminate 33 in which resin-impregnated sheets different in array direction of the continuous fibers 34 from each other are stacked in multiple layers.

In this case, the extension fibers 35 are extended end parts of the respective continuous fibers 34, and thus have respective root parts firmly held by the base material part in the overlapping part 30. Additionally, the pseudo isotropy provided allows the continuous fibers 34 to extend in multi-axis directions in units of the sheet laminate 33. Thus, the extension fibers 35 extend from the entire circumference of the inner peripheral wall of the plunging region of the pin 11. This structure enables more firmly welding between the stirred weld 4 and the base material part around the stirred weld 4.

When the pin 11 is plunged by lowering the pin 11 until the pin 11 enters the second member 32, the extension fibers 35 can be extended not only from the first member 31 but also from the second member 32. This enables a state where the stirred weld 4 can be connected to the first member 31 and the second member 32 with the extension fibers 35 in the overlapping part 30. Thus, the welding strength between the first member 31 and the second member 32 can be further improved.

The tool 1 used in the present embodiment includes the clamp 13 having the hollow part into which the shoulder 12 is inserted. Thus, an annular region is formed between the inner wall surface of the hollow part of the clamp 13 and the outer peripheral surface of the pin 11. Then, the overflow material OF, which is the resin molding material overflowing due to the plunging of the pin 11, is backfilled in a direction indicated by each arrow f1 in FIGS. 9 and 10, the direction being from the annular region toward the center of the plunging region.

The backfill direction of each arrow f1 is along the extending direction of the extension fibers 35. This backfill does not cause the extension fibers 35 to be pushed back toward the base material part, and thus the extension fibers 35 are naturally wrapped into the overflow material OF when the overflow material OF is backfilled. Thus, the wrapped part 37 can be formed in which the extension fibers 35 are favorably bonded to the resin material of the stirred weld 4, and thus can contribute to improvement of the welding strength.

The welded assembly 3 formed according to the present embodiment includes the first member 31 and the second member 32 that are each formed of the thermoplastic resin molding mixed with the continuous fibers 34 as a fiber material, the overlapping part 30 where the first member 31 and the second member 32 overlap each other while at least partially being in contact with each other, and the stirred weld 4 in which the first member 31 and the second member 32 are welded by friction stir spot welding, the stirred weld 4 being provided in the overlapping part 30. The stirred weld 4 includes the wrapped part 37 in which the extension fibers 35 formed by the continuous fibers 34 in the overlapping part 30 extending from the periphery of the stirred weld 4 are wrapped into the resin material constituting the stirred weld 4.

The welded assembly 3 includes the stirred weld 4 provided with the wrapped part 37, so that the stirred weld 4, and the base material part including the first member 31 and the second member 32 and being located around the stirred weld 4, are not only welded depending on welding between the resins, but also connected by the extension fibers 35. Thus, the welded assembly 3 can be provided in which the welding strength between the stirred weld 4 and the base material part is improved.

What is claimed is:

1. A friction stir spot welding method, comprising:
    disposing a first member and a second member to form an overlapping part where the first member and the second member overlap each other while being at least partially in contact with each other, wherein the first member is formed of a thermoplastic resin molding mixed with a fiber material, and the second member is formed of a molding containing at least a thermoplastic resin;
    disposing a tool, which is a double-acting tool for friction stir spot welding including a pin and a shoulder including a hollow part into which the pin is inserted, against the overlapping part so that a rotation axis of the tool is along an overlapping direction of the first member and the second member while rotating at least the pin around the rotation axis;
    plunging the pin into the overlapping part from a first member side to perform friction stir so that extension fibers extended from the fiber material of the first member in the overlapping part remain around a plunging region of the pin while retracting the shoulder from the overlapping part in a direction of the rotation axis to release the thermoplastic resin molding overflowed by the plunging of the pin into a surrounding region of the pin by the retraction of the shoulder; and
    bringing the shoulder close to the overlapping part in the direction of the rotation axis to wrap the extension fibers when the resin molding material overflowed is backfilled into the plunging region from the surrounding region while retracting the pin from the overlapping part.

2. The friction stir spot welding method according to claim 1, wherein
    the thermoplastic resin molding of the first member includes continuous fibers, and
    the second member includes continuous fibers.

3. The friction stir spot welding method according to claim 2, wherein
    the tool further includes a clamp provided with a hollow part into which the shoulder is to be inserted,
    the surrounding region is an annular region formed between an inner wall surface of the hollow part of the clamp and an outer peripheral surface of the pin, and
    the overflowed resin molding material is backfilled in a direction from the annular region toward a center of the plunging region.

4. The friction stir spot welding method according to claim 1, wherein
    the tool further includes a clamp provided with a hollow part into which the shoulder is to be inserted,
    the surrounding region is an annular region formed between an inner wall surface of the hollow part of the clamp and an outer peripheral surface of the pin, and
    the overflowed resin molding material is backfilled in a direction from the annular region toward a center of the plunging region.

5. The friction stir spot welding method according to claim 4, wherein the continuous fibers are composed of any of carbon fibers, glass fibers, ceramic fibers, metal fibers, and organic fibers.

6. The friction stir spot welding method according to claim 1, wherein the second member is formed of the thermoplastic resin molding mixed with the fiber material.

7. The friction stir spot welding method according to claim 6, wherein the fiber material in the first member and the second member comprises continuous fibers.

8. The friction stir spot welding method according to claim 7, wherein the first member and the second member are each formed by stacking multiple prepregs, each prepreg of the multiple prepregs comprising a sheet in which an array of the continuous fibers is impregnated with the thermoplastic resin.

9. The friction stir spot welding method according to claim 8, wherein the multiple prepregs are stacked such that an array direction of the continuous fibers differs between at least two adjacent prepregs.

10. The friction stir spot welding method according to claim 9, wherein the stacking of prepregs with differing array directions provides pseudo isotropy to the first member and the second member.

11. The friction stir spot welding method according to claim 1, wherein the continuous fibers are composed of any of carbon fibers, glass fibers, ceramic fibers, metal fibers, and organic fibers.

12. The friction stir spot welding method according to claim 1, wherein the thermoplastic resin is composed of any of polypropylene (PP), polyethylene (PE), polyamide (PA), polystyrene (PS), polyaryletherketone (PAEK), polyacetal (POM), polycarbonate (PC), polyethylene terephthalate (PET), polyetheretherketone (PEEK), polyphenylene sulfide (PPS), ABS resin, and thermoplastic epoxy resin.

13. The friction stir spot welding method according to claim 1, wherein the first member and the second member are each partially formed of a laminate of sheets in which an array of continuous fibers is impregnated with a thermoplastic resin.

14. A welded assembly, comprising:
a first member formed of a thermoplastic resin molding mixed with a fiber material;
a second member formed of a molding containing at least a thermoplastic resin;
an overlapping part in which the first member and the second member overlap each other while at least partially being in contact with each other, and
a stirred weld in which the first member and the second member are welded by friction stir spot welding by a tool, the stirred weld being provided in the overlapping part, wherein
the tool is a double-acting tool for friction stir spot welding including a pin and a shoulder including a hollow part into which the pin is inserted,
the tool is disposed against the overlapping part so that a rotation axis of the tool is along an overlapping direction of the first member and the second member while rotating at least the pin around the rotation axis,
the pin is plunged into the overlapping part from a first member side to perform friction stir so that extension fibers extended from the fiber material of the first member in the overlapping part remain around a plunging region of the pin while retracting the shoulder from the overlapping part in a direction of the rotation axis to release the thermoplastic resin molding overflowed by the plunging of the pin into a surrounding region of the pin by the retraction of the shoulder,
the shoulder is brought close to the overlapping part in the direction of the rotation axis to wrap the extension fibers into a wrapped part when the resin molding material overflowed is backfilled into the plunging region from the surrounding region while retracting the pin from the overlapping part, and
the stirred weld includes the wrapped part in which extension fibers extend from the fiber material in the overlapping part extend from a periphery of the stirred weld and are wrapped into a resin material constituting the stirred weld.

\* \* \* \* \*